(12) United States Patent
Wang et al.

(10) Patent No.: US 11,202,294 B2
(45) Date of Patent: Dec. 14, 2021

(54) METHODS AND DEVICES FOR DETERMINING DOWNLINK RESOURCE SET AND SENDING RESOURCE POSITION INFORMATION

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 290 days.

(21) Appl. No.: 16/497,422

(22) PCT Filed: Mar. 7, 2018

(86) PCT No.: PCT/CN2018/078259
§ 371 (c)(1),
(2) Date: Sep. 24, 2019

(87) PCT Pub. No.: WO2018/171425
PCT Pub. Date: Sep. 27, 2018

(65) Prior Publication Data
US 2021/0298025 A1    Sep. 23, 2021

(30) Foreign Application Priority Data
Mar. 24, 2017 (CN) .......................... 201710184476.9

(51) Int. Cl.
*H04W 72/12* (2009.01)
*H04W 72/04* (2009.01)
*H04L 5/00* (2006.01)

(52) U.S. Cl.
CPC ....... *H04W 72/0493* (2013.01); *H04L 5/0094* (2013.01); *H04W 72/042* (2013.01); *H04W 72/0446* (2013.01); *H04W 72/0453* (2013.01)

(58) Field of Classification Search
CPC .......... H04W 72/0493; H04W 72/042; H04W 72/0446; H04W 72/0453; H04L 5/0094
See application file for complete search history.

(56) References Cited

U.S. PATENT DOCUMENTS

| 2013/0188577 A1 | 7/2013 | Papasakellariou et al. |
| 2014/0153539 A1 | 6/2014 | Seo et al. |
| (Continued) | | |

FOREIGN PATENT DOCUMENTS

| CN | 102395204 A | 3/2012 |
| CN | 102438314 A | 5/2012 |

OTHER PUBLICATIONS

Apple Inc., "On the Structure and Usage Scenarios of ePDCCH" 3GPP TSG RAN WG1 Meeting #67, R1-114300, San Francisco, USA, Nov. 14-18, 2011.
(Continued)

*Primary Examiner* — Melvin C Marcelo
(74) *Attorney, Agent, or Firm* — Kilpatrick Townsend & Stockton, LLP

(57) ABSTRACT

The present application discloses methods and devices for determining a downlink resource set and sending resource position information, and particularly relates to a method for determining, by a terminal, a downlink control channel resource set, a method for sending, by a base station, a position related to a downlink control channel resource set, and related devices. A terminal obtains, in a predefined manner and/or by receiving a notification of a base station, a frequency domain position and a time domain position of a downlink control channel resource set corresponding to the terminal, so as to determine that the downlink control (Continued)

channel resource set corresponding to the terminal is a third downlink control channel resource set. The base station transmits a common downlink control channel and/or a terminal-dedicated downlink control channel on the frequency domain and time domain positions of the downlink control channel resource set determined by the terminal.

20 Claims, 6 Drawing Sheets

(56) References Cited

U.S. PATENT DOCUMENTS

| | | | |
|---|---|---|---|
| 2014/0177547 A1 | 6/2014 | Guo et al. | |
| 2018/0324688 A1* | 11/2018 | Li | H04W 72/0453 |
| 2018/0324843 A1* | 11/2018 | Lee | H04L 5/0053 |
| 2019/0052434 A1* | 2/2019 | Zhou | H04W 16/28 |

OTHER PUBLICATIONS

NTT Docomo, Inc."Discussion on initial access design for NR", 3GPP TSG RAN WG1 Meeting #86bis, Lisbon, Portugal Oct. 10-14, 2016, total 8 pages, R1-1610073.

Ericsson, "System information delivery in NR", 3GPP TSG-RAN WG1 Meeting #87, Reno, Nevada, USA, Nov. 14-18, 2016, total 6 pages, R1-1611901.

ETRI, "Delivery of remaining system information", 3GPP TSG RAN WG1 Meeting #88, Athens, Greece Feb. 13-17, 2017, total 4 pages, R1-1702342.

CATT: "NR DL control channel structure", 3GPP TSG RAN WG1 AH_NR Meeting; R1-1700189, Spokane, USA; Jan. 16, 2017-Jan. 16, 2017.

Panasonic: "Discussion on group common PDCCH", 3GPP TSG RAN WG1 Meeting#88; R1-1702764, Athens, Greece; Feb. 13, 2017-Feb. 17, 2017.

* cited by examiner

METHODS AND DEVICES FOR DETERMINING DOWNLINK RESOURCE SET AND SENDING RESOURCE POSITION INFORMATION

This application is a US National Stage of International Application No. PCT/CN2018/078259, filed Mar. 7, 2018, which claims priority to Chinese Patent Application No. 201710184476.9, filed with the Chinese Patent Office on Mar. 24, 2017, and entitled "Method and device for determining downlink resource set, and method and device for transmitting resource position information", which is hereby incorporated by reference in its entirety.

FIELD

The present invention relates to the field of communications, and particularly to a method and device for determining a downlink resource set, and a method and device for transmitting resource position information.

BACKGROUND

The mobile Internet is overthrowing the traditional mobile communication service modes, providing its subscribers with an unanticipated use experience, and profoundly influencing various aspects in our working and life. In mobile communication, as more and more demands for new services are emerging constantly, there is a demand for higher performance of future mobile communication systems, e.g., a higher peak rate, a higher user experienced rate, a shorter delay, high reliability, higher spectrum efficiency, higher energy consumption efficiency, etc., and a demand for supporting more accessing user equipments, and various types of services. A terminal may need to support a number of transmission modes, various scenarios, and more types of services concurrently. The complexity and power consumption of the terminal side is required to be lowered. If the terminal needs to listen to a downlink control channel throughout a transmission bandwidth, then there will be a great challenge to energy consumption control of the terminal, and a delay at the terminal side will be increased. Moreover in order to improve the utilization ratio of resources, and to satisfy some future application scenarios (e.g., Inter-Cell Interference Coordination (ICIC)), a transmission resource of a downlink control channel shall be configured more flexibly.

Scheduling information and other control information is carried in the existing Long Term Evolution (LTE) Physical Downlink Control Channel (PDCCH). There may be a plurality of PDCCHs in a control region of each downlink sub-frames, where the size of the control region indicated by a Physical Control Format Indication Channel (PCFICH) ranges from 1 to 4 OFDM symbols. A control channel is transmitted in one or more consecutive Control Channel Elements (CCEs), where each CCE includes 9 Resource Element Groups (REGs), and REGs in a CCE or CCEs of a PDCCH are REGs carrying neither PCFICH nor Physical HARQ Indication Channel (PHICH).

A base station needs to allocate a resource for a PDCCH without any confliction between different PDCCHs, that is, when some CCE or CCEs has or have been occupied by a PDCCH, the CCE or CCEs can not be allocated to any other PDCCH.

The existing LTE Enhanced-Physical Downlink Control Channel (E-PDCCH) is transmitted in a data region of a sub-frame other than a space for transmitting a PDCCH. The number of blind detections for an E-PDCCH is defined as prescribed in the protocol, and a table of defined E-PDCCH candidates in respective scenarios has been created.

In the existing LTE system, the terminal needs to listen to a downlink control channel throughout the transmission bandwidth or throughout a sub-frame in the time domain. The transmission bandwidth in the next generation of wireless communication system is expected to be far larger than the transmission bandwidth in the existing LTE system.

There may be the following technical problems in the prior art.

Firstly the terminal listens to its control channel throughout the transmission bandwidth, so downlink resources may be wasted, considerable power may be consumed, and interference can not be suppressed in the frequency domain.

Secondly as ascertained in the sessions of the existing standard, there is such a scenario in a 5G system that a common PDCCH is transmitted over a part of downlink control channel resources, and a UE-specific PDCCH is transmitted over the other part of the downlink control channel resources, but there has been absent so far a definite solution to determining specific time domain and frequency domain positions of a set of downlink control channel resources.

SUMMARY

Embodiments of the invention provide a method and device for determining a downlink resource set, and a method and device for transmitting resource position information so as to address the technical problems above in the prior art.

In a first aspect, an embodiment of the invention provides a method for determining a downlink resource set in a user equipment, the method including:

obtaining a third frequency domain position for determining a downlink control channel resource set corresponding to the user equipment, based upon preset information of the first frequency domain position of a predefined first downlink control channel resource set, and/or based upon received first information, transmitted by a base station, including indication information of the second frequency domain position of the first downlink control channel resource set;

obtaining a third time domain position for determining the downlink control channel resource set corresponding to the user equipment, based upon preset information of the first time domain position of the predefined first downlink control channel resource set, and/or based upon the received first information, transmitted by the base station, including indication information of the second time domain position of the first downlink control channel resource set; and determining the downlink control channel resource set corresponding to the user equipment as a third downlink control channel resource set based upon the third frequency domain position and the third time domain position.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally when the preset information of the first frequency domain position is a fourth frequency domain position occupied by a PBCH and/or a PSS and/or an SSS, the obtaining the third frequency domain position for determining the downlink control channel resource set corresponding to the user equipment, based upon the preset information of the first frequency domain position of the predefined first downlink control channel resource set includes:

obtaining the third frequency domain position for determining the downlink control channel resource set corresponding to the user equipment, based upon the fourth frequency domain position.

Optionally when the preset information of the first frequency domain position is a first preset offset value from a fourth frequency domain position occupied by a PBCH and/or a PSS and/or an SSS, the obtaining the third frequency position for determining the downlink control channel resource set corresponding to the user equipment, based upon the preset information of the first frequency domain position of the predefined first downlink control channel resource set includes:

obtaining the third frequency domain position for determining the downlink control channel resource set corresponding to the user equipment, based upon the fourth frequency domain position and the first preset offset value.

Optionally when the preset information of the first frequency domain position is a fourth frequency domain position occupied by a PBCH and/or a PSS and/or an SSS, the obtaining the third frequency domain position for determining the downlink control channel resource set corresponding to the user equipment, based upon the preset information of the first frequency domain position of the predefined first downlink control channel resource set, and based upon the received first information, transmitted by the base station, including the indication information of the second frequency domain position of the first downlink control channel resource set includes:

obtaining the indication information of the second frequency domain position of the first downlink control channel resource set based upon the received first information, transmitted by the base station, including the indication information of the second frequency domain position, wherein the indication information of the second frequency domain position is indication information indicating a second offset value from the fourth frequency domain position; and obtaining the third frequency domain position for determining the downlink control channel resource set corresponding to the user equipment, based upon the fourth frequency domain position and the second preset offset value.

Optionally the obtaining the third frequency domain position for determining the downlink control channel resource set corresponding to the user equipment, based upon the received first information, transmitted by the base station, including the indication information of the second frequency domain position of the first downlink control channel resource set includes:

obtaining the indication information of the second frequency domain position of the first downlink control channel resource set based upon the received first information, transmitted by the base station, including the indication information of the second frequency domain position, wherein the indication information of the second frequency domain position is indication information indicating a frequency domain position of the downlink control channel resource set corresponding to the user equipment; and obtaining the third frequency domain position for determining the downlink control channel resource set corresponding to the user equipment, based upon the indication information of the second frequency domain position.

Optionally the obtaining the third time domain position for determining the downlink control channel resource set corresponding to the user equipment, based upon the received first information, transmitted by the base station, including the indication information of the second time domain position of the first downlink control channel resource set includes:

obtaining the indication information of the second time domain position of the first downlink control channel resource set based upon the received first information, transmitted by the base station, including the indication information of the second time domain position, wherein the indication information of the second time domain position is indication information indicating a time domain position of the downlink control channel resource set corresponding to the user equipment; and obtaining the third time domain position for determining the downlink control channel resource set corresponding to the user equipment, based upon the indication information of the second time domain position.

Optionally the obtaining the third time domain position for determining the downlink control channel resource set corresponding to the user equipment, based upon the preset information of the first time domain position of the predefined first downlink control channel resource set includes:

obtaining the third time domain position for determining the downlink control channel resource set corresponding to the user equipment, based upon a preset size of the first time domain position and a preset start position of the first time domain position of the predefined first downlink control channel resource set.

Optionally the first information is higher-layer signaling; and the first downlink control channel resource set is configured for transmitting a UE-specific downlink control channel.

Optionally the obtaining the third frequency domain position for determining the downlink control channel resource set corresponding to the user equipment, based upon the preset information of the first frequency domain position of the predefined first downlink control channel resource set includes:

obtaining the third frequency domain position for determining the downlink control channel resource set corresponding to the user equipment, based upon a preset size of the first frequency domain position and a preset start position of the first frequency domain position of the predefined first downlink control channel resource set.

Optionally the obtaining the third frequency domain position for determining the downlink control channel resource set corresponding to the user equipment, based upon the received first information, transmitted by the base station, including the indication information of the second frequency domain position of the first downlink control channel resource set includes:

obtaining the indication information of the second frequency domain position of the first downlink control channel resource set based upon the received first information, transmitted by the base station, including the indication information of the second frequency domain position, wherein the indication information of the second frequency domain position is indication information indicating a frequency domain position of the downlink control channel resource set corresponding to the user equipment; and obtaining the third frequency domain position for determining the downlink control channel resource set corresponding to the user equipment, based upon the indication information of the second frequency domain position.

Optionally when the indication information of the second frequency domain position is indication information indicating the frequency domain position of the downlink control channel resource set corresponding to the user equipment, the indication information of the second frequency domain position is indication information indicating a start frequency domain position of the downlink control channel resource set corresponding to the user equipment, and a frequency domain resource size occupied by the downlink control channel resource set corresponding to the user equipment; or the indication information of the second frequency domain position is indication information of element indexes corresponding to frequency domain resource elements occupied by the downlink control channel resource set corresponding to the user equipment, or element group indexes corresponding to frequency domain resource element groups occupied by the downlink control channel resource set corresponding to the user equipment.

Optionally when the preset information of the first frequency domain position is a preset start position of the first frequency domain position, the obtaining the third frequency domain position for determining the downlink control channel resource set corresponding to the user equipment, based upon the preset information of the first frequency domain position of the predefined first downlink control channel resource set, and based upon the received first information, transmitted by the base station, including the indication information of the second frequency domain position of the first downlink control channel resource set includes:

obtaining the indication information of the second frequency domain position of the first downlink control channel resource set based upon the received first information, transmitted by the base station, including the indication information of the second frequency domain position, wherein the indication information of the second frequency domain position indicates a frequency domain position size occupied by the first downlink control channel resource set; and obtaining the third frequency domain position for determining the downlink control channel resource set corresponding to the user equipment, based upon the preset start position of the first frequency domain position, and the frequency domain position size occupied by the first downlink control channel resource set.

Optionally the obtaining the third time domain position for determining the downlink control channel resource set corresponding to the user equipment, based upon the preset information of the first time domain position of the predefined first downlink control channel resource set includes:

obtaining the third time domain position for determining the downlink control channel resource set corresponding to the user equipment, based upon a preset size of the first time domain position and a preset start position of the first time domain position of the predefined first downlink control channel resource set.

Optionally the obtaining the third time domain position for determining the downlink control channel resource set corresponding to the user equipment, based upon the received first information, transmitted by the base station, including the indication information of the second time domain position of the first downlink control channel resource set includes:

obtaining the indication information of the second time domain position of the first downlink control channel resource set based upon the received first information, transmitted by the base station, including the indication information of the second time domain position, wherein the indication information of the second time domain position is indication information indicating a time domain position of the downlink control channel resource set corresponding to the user equipment; and obtaining the third time domain position for determining the downlink control channel resource set corresponding to the user equipment, based upon the indication information of the second time domain position.

In a second aspect, an embodiment of the invention provides a method for transmitting resource position information of a downlink control channel resource set, applied in a base station, the method including:

transmitting, by the base station, first information, including indication information of the second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or transmitting, by the base station, the first information, including indication information of the second time domain position of the first downlink control channel resource set, to the user equipment so that the user equipment obtains the indication information of the second time domain position for determining a third time domain position of the downlink control channel resource set corresponding to the user equipment, based upon the first information.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally the indication information of the second frequency domain position indicates the second frequency domain position directly; or when a first preset frequency domain position corresponding to the user equipment is predefined, the indication information of the second frequency domain position indicates a first preset offset value of the second frequency domain position from the first preset frequency domain position.

Optionally the indication information of the second time domain position indicates the second time domain position directly.

Optionally the first information is higher-layer signaling; and the first downlink control channel resource set is configured for transmitting a UE-specific downlink control channel.

Optionally the indication information of the second frequency domain position indicates the second frequency domain position directly; or when a first preset start frequency domain position corresponding to the user equipment is predefined, the indication information of the second frequency domain position indicates the size of the second frequency domain position.

Optionally the indication information of the second time domain position indicates the second time domain position directly.

In a third aspect, an embodiment of the invention provides a user equipment including:

a first obtaining module configured to obtain a third frequency domain position for determining a downlink control channel resource set corresponding to the user equipment, based upon preset information of the first frequency domain position of a predefined first downlink control channel resource set, and/or based upon received first information, transmitted by a base station, including indication information of the second frequency domain position of the first downlink control channel resource set;

a second obtaining module configured to obtain a third time domain position for determining the downlink control channel resource set corresponding to the user equipment, based upon preset information of the first time domain position of the predefined first downlink control channel resource set, and/or based upon the received first information, transmitted by the base station, including indication information of the second time domain position of the first downlink control channel resource set; and a first determining module configured to determine the downlink control channel resource set corresponding to the user equipment as a third downlink control channel resource set based upon the third frequency domain position and the third time domain position.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally the first obtaining module includes:

a first obtaining sub-module configured, when the preset information of the first frequency domain position is a fourth frequency domain position occupied by a PBCH and/or a PSS and/or an SSS, to obtain the third frequency domain position for determining the downlink control channel resource set corresponding to the user equipment, based upon the fourth frequency domain position.

Optionally the first obtaining module includes:

a second obtaining sub-module configured, when the preset information of the first frequency domain position is a first preset offset value from a fourth frequency domain position occupied by a PBCH and/or a PSS and/or an SSS, to obtain the third frequency domain position for determining the downlink control channel resource set corresponding to the user equipment, based upon the fourth frequency domain position and the first preset offset value.

Optionally when the preset information of the first frequency domain position is a fourth frequency domain position occupied by a PBCH and/or a PSS and/or an SSS, the first obtaining module includes:

a third obtaining sub-module configured to obtain the indication information of the second frequency domain position of the first downlink control channel resource set based upon the received first information, transmitted by the base station, including the indication information of the second frequency domain position, wherein the indication information of the second frequency domain position is indication information indicating a second offset value from the fourth frequency domain position; and a fourth obtaining sub-module configured to obtain the third frequency domain position for determining the downlink control channel resource set corresponding to the user equipment, based upon the fourth frequency domain position and the second preset offset value, wherein the third frequency domain position is a frequency domain position by shifting the fourth frequency domain position by the second offset value.

Optionally the first obtaining module includes:

a fifth obtaining sub-module configured to obtain the indication information of the second frequency domain position of the first downlink control channel resource set based upon the received first information, transmitted by the base station, including the indication information of the second frequency domain position, wherein the indication information of the second frequency domain position is indication information indicating a frequency domain position of the downlink control channel resource set corresponding to the user equipment; and a sixth obtaining sub-module configured to obtain the third frequency domain position for determining the downlink control channel resource set corresponding to the user equipment, based upon the indication information of the second frequency domain position.

Optionally the second obtaining module includes:

a seventh obtaining sub-module configured to obtain the indication information of the second time domain position of the first downlink control channel resource set based upon the received first information, transmitted by the base station, including the indication information of the second time domain position, wherein the indication information of the second time domain position is indication information indicating a time domain position of the downlink control channel resource set corresponding to the user equipment; and an eighth obtaining sub-module configured to obtain the third time domain position for determining the downlink control channel resource set corresponding to the user equipment, based upon the indication information of the second time domain position.

Optionally the second obtaining module includes:

a ninth obtaining sub-module configured to obtain the third time domain position for determining the downlink control channel resource set corresponding to the user equipment, based upon a preset size of the first time domain position and a preset start position of the first time domain position of the predefined first downlink control channel resource set.

Optionally the first information is higher-layer signaling; and the first downlink control channel resource set is configured for transmitting a UE-specific downlink control channel.

Optionally the first obtaining module includes:

a tenth obtaining sub-module configured to obtain the third frequency domain position for determining the downlink control channel resource set corresponding to the user equipment, based upon a preset size of the first frequency domain position and a preset start position of the first frequency domain position of the predefined first downlink control channel resource set.

Optionally the first obtaining module includes:

an eleventh obtaining sub-module configured to obtain the indication information of the second frequency domain position of the first downlink control channel resource set based upon the received first information, transmitted by the base station, including the indication information of the second frequency domain position, wherein the indication information of the second frequency domain position is indication information indicating a frequency domain position of the downlink control channel resource set corresponding to the user equipment; and a twelfth obtaining sub-module configured to obtain the third frequency domain position for determining the downlink control channel resource set corresponding to the user equipment, based upon the indication information of the second frequency domain position.

Optionally when the indication information of the second frequency domain position is indication information indicating the frequency domain position of the downlink control channel resource set corresponding to the user equipment, the indication information of the second frequency domain position is indication information indicating a start frequency domain position of the downlink control channel resource set corresponding to the user equipment, and a frequency domain resource size occupied by the downlink control channel resource set corresponding to the user equipment; or the indication information of the second frequency domain position is indication information of element indexes corresponding to frequency domain resource elements occupied by the downlink control channel resource set corresponding to the user equipment, or element group indexes corresponding to frequency domain resource element groups occupied by the downlink control channel resource set corresponding to the user equipment.

Optionally when the preset information of the first frequency domain position is a preset start position of the first frequency domain position, the first obtaining module includes:

a thirteenth obtaining sub-module configured to obtain the indication information of the second frequency domain position of the first downlink control channel resource set based upon the received first information, transmitted by the base station, including the indication information of the second frequency domain position, wherein the indication information of the second frequency domain position indicates a frequency domain position size occupied by the first downlink control channel resource set; and a fourteenth obtaining sub-module configured to obtain the third frequency domain position for determining the downlink control channel resource set corresponding to the user equipment, based upon the preset start position of the first frequency domain position, and the frequency domain position size occupied by the first downlink control channel resource set.

Optionally the second obtaining module includes:

a fifteenth obtaining sub-module configured to obtain the third time domain position for determining the downlink control channel resource set corresponding to the user equipment, based upon a preset size of the first time domain position and a preset start position of the first time domain position of the predefined first downlink control channel resource set.

Optionally the second obtaining module includes:

a sixteenth obtaining sub-module configured to obtain the indication information of the second time domain position of the first downlink control channel resource set based upon the received first information, transmitted by the base station, including the indication information of the second time domain position, wherein the indication information of the second time domain position is indication information indicating a time domain position of the downlink control channel resource set corresponding to the user equipment; and a seventeenth obtaining sub-module configured to obtain the third time domain position for determining the downlink control channel resource set corresponding to the user equipment, based upon the indication information of the second time domain position.

In a fourth aspect, an embodiment of the invention provides a base station including:

a first transmitting module configured to transmit first information, including indication information of the second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or to transmit the first information, including indication information of the second time domain position of the first downlink control channel resource set, to the user equipment so that the user equipment obtains the indication information of the second time domain position for determining a third time domain position of the downlink control channel resource set corresponding to the user equipment, based upon the first information.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally the indication information of the second frequency domain position indicates the second frequency domain position directly; or when a first preset frequency domain position corresponding to the user equipment is predefined, the indication information of the second frequency domain position indicates a first offset value of the second frequency domain position from the first preset frequency domain position.

Optionally the indication information of the second time domain position indicates the second time domain position directly.

Optionally the first information is higher-layer signaling; and the first downlink control channel resource set is configured for transmitting a UE-specific downlink control channel.

Optionally the indication information of the second frequency domain position indicates the second frequency domain position directly; or when a first preset start frequency domain position corresponding to the user equipment is predefined, the indication information of the second frequency domain position indicates the size of the second frequency domain position.

Optionally the indication information of the second time domain position indicates the second time domain position directly.

In a fifth aspect, an embodiment of the invention provides a user equipment for determining a downlink control channel resource set, the user equipment including a processor and a memory, wherein:

the processor is configured to read and execute program in the memory:

to obtain a third frequency domain position for determining a downlink control channel resource set corresponding to the user equipment, based upon preset information of the first frequency domain position of a predefined first downlink control channel resource set, and/or based upon received first information, transmitted by a base station, including indication information of the second frequency domain position of the first downlink control channel resource set;

to obtain a third time domain position for determining the downlink control channel resource set corresponding to the user equipment, based upon preset information of the first time domain position of the predefined first downlink control channel resource set, and/or based upon the received first information, transmitted by the base station, including indication information of the second time domain position of the first downlink control channel resource set; and to determine the downlink control channel resource set corresponding to the user equipment as a third downlink control channel resource set based upon the third frequency domain position and the third time domain position.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally when the preset information of the first frequency domain position is a fourth frequency domain position occupied by a PBCH and/or a PSS and/or an SSS, the processor is configured:

to obtain the third frequency domain position for determining the downlink control channel resource set corresponding to the user equipment, based upon the fourth frequency domain position.

Optionally when the preset information of the first frequency domain position is a first preset offset value from a fourth frequency domain position occupied by a PBCH and/or a PSS and/or an SSS, the processor is configured:

to obtain the third frequency domain position for determining the downlink control channel resource set corresponding to the user equipment, based upon the fourth frequency domain position and the first preset offset value.

Optionally when the preset information of the first frequency domain position is a fourth frequency domain position occupied by a PBCH and/or a PSS and/or an SSS, the processor is configured:

to obtain the indication information of the second frequency domain position of the first downlink control channel resource set based upon the received first information, transmitted by the base station, including the indication information of the second frequency domain position, wherein the indication information of the second frequency domain position is indication information indicating a second offset value from the fourth frequency domain position; and to obtain the third frequency domain position for determining the downlink control channel resource set corresponding to the user equipment, based upon the fourth frequency domain position and the second preset offset value.

Optionally the processor is configured:

to obtain the indication information of the second frequency domain position of the first downlink control channel resource set based upon the received first information, transmitted by the base station, including the indication information of the second frequency domain position, wherein the indication information of the second frequency domain position is indication information indicating a frequency domain position of the downlink control channel resource set corresponding to the user equipment; and to obtain the third frequency domain position for determining the downlink control channel resource set corresponding to the user equipment, based upon the indication information of the second frequency domain position.

Optionally the processor is configured:

to obtain the indication information of the second time domain position of the first downlink control channel resource set based upon the received first information, transmitted by the base station, including the indication information of the second time domain position, wherein the indication information of the second time domain position is indication information indicating a time domain position of the downlink control channel resource set corresponding to the user equipment; and to obtain the third time domain position for determining the downlink control channel resource set corresponding to the user equipment, based upon the indication information of the second time domain position.

Optionally the processor is configured:

to obtain the third time domain position for determining the downlink control channel resource set corresponding to the user equipment, based upon a preset size of the first time domain position and a preset start position of the first time domain position of the predefined first downlink control channel resource set.

Optionally the first information is higher-layer signaling; and the first downlink control channel resource set is configured for transmitting a UE-specific downlink control channel.

Optionally the processor is configured:

to obtain the third frequency domain position for determining the downlink control channel resource set corresponding to the user equipment, based upon a preset size of the first frequency domain position and a preset start position of the first frequency domain position of the first downlink control channel resource set.

Optionally the processor is configured:

to obtain the indication information of the second frequency domain position of the first downlink control channel resource set based upon the received first information, transmitted by the base station, including the indication information of the second frequency domain position, wherein the indication information of the second frequency domain position is indication information indicating a frequency domain position of the downlink control channel resource set corresponding to the user equipment; and to obtain the third frequency domain position for determining the downlink control channel resource set corresponding to the user equipment, based upon the indication information of the second frequency domain position.

Optionally the indication information of the second frequency domain position is indication information indicating a start frequency domain position of the downlink control channel resource set corresponding to the user equipment, and a frequency domain resource size occupied by the downlink control channel resource set corresponding to the user equipment; or the indication information of the second frequency domain position is indication information of element indexes corresponding to frequency domain resource elements occupied by the downlink control channel resource set corresponding to the user equipment, or element group indexes corresponding to frequency domain resource element groups occupied by the downlink control channel resource set corresponding to the user equipment.

Optionally when the preset information of the first frequency domain position is a preset start position of the first frequency domain position, the processor is configured:

to obtain the indication information of the second frequency domain position of the first downlink control channel resource set based upon the received first information, transmitted by the base station, including the indication information of the second frequency domain position, wherein the indication information of the second frequency domain position indicates a frequency domain position size occupied by the first downlink control channel resource set; and to obtain the third frequency domain position for determining the downlink control channel resource set corresponding to the user equipment, based upon the preset start position of the first frequency domain position, and the frequency domain position size occupied by the first downlink control channel resource set.

Optionally the processor is configured:

to obtain the third time domain position for determining the downlink control channel resource set corresponding to the user equipment, based upon a preset size of the first time domain position and a preset start position of the first time domain position of the predefined first downlink control channel resource set.

Optionally the processor is configured:

to obtain the indication information of the second time domain position of the first downlink control channel resource set based upon the received first information, transmitted by the base station, including the indication information of the second time domain position, wherein the indication information of the second time domain position is indication information indicating a time domain position of the downlink control channel resource set corresponding to the user equipment; and to obtain the third time domain position for determining the downlink control channel resource set corresponding to the user equipment, based upon the indication information of the second time domain position.

In a sixth aspect, an embodiment of the invention provides a base station for transmitting resource position information of a downlink control channel resource set in a base station, the base station including a processor and a memory, wherein:

the processor is configured to read and execute program in the memory:

to transmit first information, including indication information of the second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or to transmit the first information, including indication information of the second time domain position of the first downlink control channel resource set, to the user equipment so that the user equipment obtains the indication information of the second time domain position for determining a third time domain position of the downlink control channel resource set corresponding to the user equipment, based upon the first information.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally the indication information of the second frequency domain position indicates the second frequency domain position directly; or when a first preset frequency domain position corresponding to the user equipment is predefined, the indication information of the second frequency domain position indicates a first preset offset value of the second frequency domain position from the first preset frequency domain position.

Optionally the indication information of the second time domain position indicates the second time domain position directly.

Optionally the first information is higher-layer signaling; and the first downlink control channel resource set is configured for transmitting a UE-specific downlink control channel.

Optionally the indication information of the second frequency domain position indicates the second frequency domain position directly; or when a first preset start frequency domain position corresponding to the user equipment is predefined, the indication information of the second frequency domain position indicates the size of the second frequency domain position.

Optionally the indication information of the second time domain position indicates the second time domain position directly.

In a seventh aspect, an embodiment of the invention provides a computer readable storage medium including program codes configured, upon being executed on a computing device, to cause the computing device to perform the method according to any one of the embodiments of the invention in the first aspect, or the method according to any one of the embodiments of the invention in the second aspect.

In the one or more technical solutions according to the embodiments of the invention, the user equipment can be freed from listening to its downlink control channel throughout a transmission bandwidth, and for such a scenario in a 5G system as ascertained in the sessions of the existing protocol that a common PDCCH is transmitted on a part of downlink control channel resources, and a UE-specific PDCCH is transmitted on the other part of the downlink control channel resources, there is proposed a technical solution to determining specific time domain and frequency domain positions of a downlink control channel resource set for the purpose of configuring the position of the downlink control channel resource set in the transmission bandwidth flexibly to thereby lower power consumption of the user equipment, and facilitate interference control n in a future wireless communication system.

DETAILED DESCRIPTION

In order to address the technical problems above in the prior art, a general idea of the technical solutions according to the embodiments of the invention is as follows.

There are provided a method and device for determining by a user equipment a downlink resource set, and a method and device for transmitting, by a base station, resource position information, where the user equipment obtains a third frequency domain position of a downlink control channel resource set corresponding to the user equipment based upon preset information of the first frequency domain position of a predefined first downlink control channel resource set, and/or based upon received first information, transmitted by the base station, including indication information of the second frequency domain position of the first downlink control channel resource set; obtains a third time domain position for determining the downlink control channel resource set corresponding to the user equipment, based upon preset information of the first time domain position of the predefined first downlink control channel resource set, and/or based upon the received first information, transmitted by the base station, including indication information of the second time domain position of the first downlink control channel resource set; and determines the downlink control channel resource set corresponding to the user equipment as a third downlink control channel resource set based upon the third frequency domain position and the third time domain position. With the technical solutions above, the technical problems above in the prior art can be addressed in effect.

In order to make the technical solutions according to the embodiments of the invention more apparent, the technical solutions above will be described below in details with reference to the drawings and in connection with specific implementations thereof. Based upon the embodiments of the invention, all the other embodiments which can occur to those ordinarily skilled in the art without any inventive effort shall fall into the claimed scope of the invention.

Figure 1:
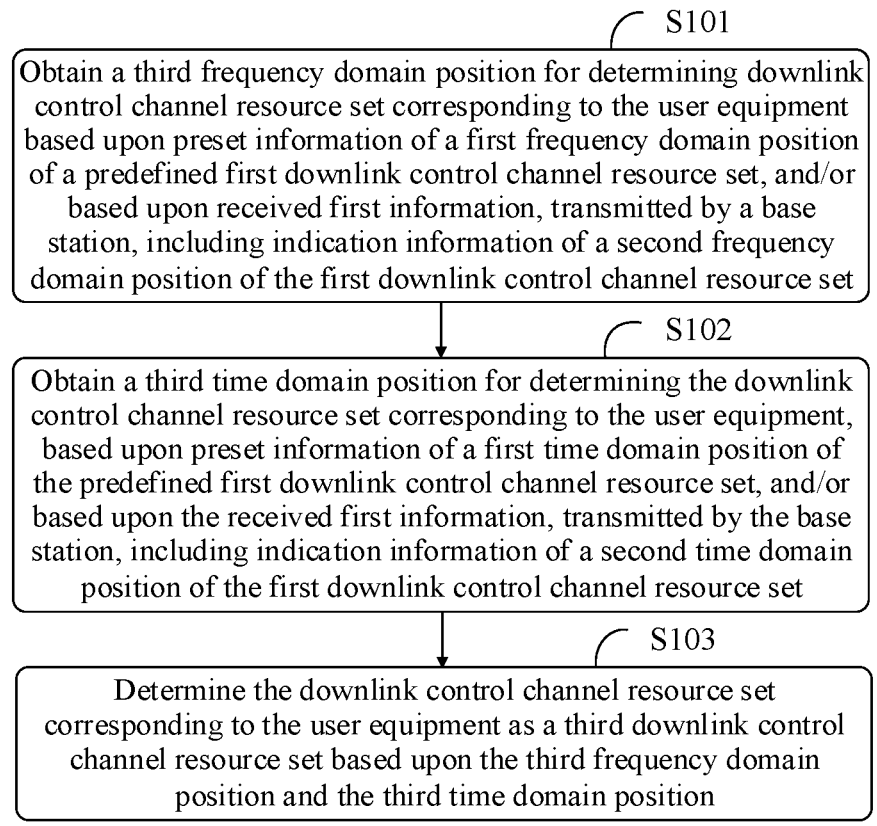
FIG. 1 is a flow chart of a method for determining a downlink control channel resource set according to an embodiment of the invention.

As illustrated in FIG. 1, a method for determining a downlink control channel resource set, applied in a user equipment, according to a first embodiment of the invention includes the following steps.

The step S101 is to obtain a third frequency domain position for determining a downlink control channel resource set corresponding to the user equipment, based upon preset information of the first frequency domain position of a predefined first downlink control channel resource set, and/or based upon received first information, transmitted by a base station, including indication information of the second frequency domain position of the first downlink control channel resource set.

The step S102 is to obtain a third time domain position for determining the downlink control channel resource set corresponding to the user equipment, based upon preset information of the first time domain position of the predefined first downlink control channel resource set, or based upon the received first information, transmitted by the base station, including indication information of the second time domain position of the first downlink control channel resource set.

The step S103 is to determine the downlink control channel resource set corresponding to the user equipment as a third downlink control channel resource set based upon the third frequency domain position and the third time domain position.

The steps 101 and S102 above can alternatively be performed concurrently or in a reversed order. For example, when the same first information includes both the indication information of the second frequency domain position of the first downlink control channel resource set, and the indication information of the second time domain position of the first downlink control channel resource set, the user equipment can obtain both the third time domain position of the downlink control channel resource set corresponding to the user equipment, and the third time domain position of the downlink control channel resource set corresponding to the user equipment. Accordingly the steps 101 and S102 specifically can be performed concurrently or in a reversed order dependent upon timing at which the user equipment executes corresponding program in software and/or hardware, although the embodiment of the invention will not be limited thereto.

For example, the preset information of the first frequency domain position of the predefined first downlink control channel resource set, and the preset information of the first time domain position of the predefined first downlink control channel resource set have been specified in a communication protocol, and shall be complied by both the base station and the user equipment, so before the step 101 and/or the step 102 above is or are performed, the base station has determined a resource set to be occupied by the base station for transmitting a downlink control channel, for example, in the following three instances without any limitation thereto (only by way of an example).

In a first instance, for example, the base station has determined a resource set to be occupied by the base station for transmitting a downlink control channel, based upon position information of time domain resource and frequency domain resource sets specified in a protocol, and in this way, if the resource set is specified in the protocol and remains unchanged, then the base station may not notify the user equipment, so the user equipment can determine by itself a specific position of the resource set based upon content specified in the protocol (where the resource set refers to a time domain resource set and/or a frequency domain resource set).

In a second instance, when the base station newly determines a resource set to be occupied by the base station for transmitting a downlink control channel (where the resource set refers to a time domain resource set and/or frequency domain resource set), based upon position information of time domain and frequency domain resource sets specified in the protocol, for example, the base station determines that there is an offset of a resource set to be occupied by the base station for transmitting a downlink control channel, from the resource set specified in the protocol, then the base station may notify the user equipment of the offset from the resource set specified in the protocol, so that the user equipment determines the specific position of the downlink resource set corresponding to the user equipment based upon the notified offset.

In a third instance, when the base station determines by itself the position of a resource set to be occupied by the base station for transmitting a downlink control channel (where the resource set refers to a time domain resource set and/or frequency domain resource set), then the base station may notify the user equipment of the determined position of the resource set, so that the user equipment determines the specific position of the downlink resource set corresponding to the user equipment based upon the notified position.

In this way, the base station can transmit the corresponding downlink control channel on the resource set determined by the base station, and the user equipment can also obtain the specific position of the resource set corresponding to the user equipment so that the user equipment receives the downlink control channel corresponding to the user equipment on the resource set corresponding to the user equipment.

In the steps 101 and 102 above, the time domain and frequency domain positions of the downlink control channel resource set corresponding to the user equipment can be determined in a number of the following specific implementations dependent upon different downlink control channels transmitted on the first downlink control channel resource set.

When the first downlink control channel resource set is a first subset of downlink control channels for transmitting a common downlink control channel, and/or the first downlink control channel resource set for transmitting a UE-specific downlink control channel when the user equipment accesses a mobile communication network for the first time, the time and frequency domain positions of the downlink control channel resource set corresponding to the user equipment are determined, where the first information is Master Information Block (MIB) information or System Information (SI), and the user equipment can obtain the time domain position and/or the frequency domain position of the downlink control channel resource set corresponding to the user equipment according to related information carried in the MIB information or the SI; and for example, the first information can be MIB information hereinafter, but will not be limited to MIB information or SI.

The first downlink control channel resource set is a second subset of downlink control channels for transmitting a UE-specific downlink control channel, where the first information is higher-layer signaling, and the user equipment can obtain the time domain position and/or the frequency domain position of the downlink control channel resource set corresponding to the user equipment according to related information carried in the higher-layer signaling.

When the first downlink control channel resource set is the first subset of downlink control channels, the time domain position and/or the frequency domain position of the downlink control channel resource set corresponding to the user equipment can be determined as follows (particularly as illustrated in FIG. 2 to FIG. 5).

Figure 2:
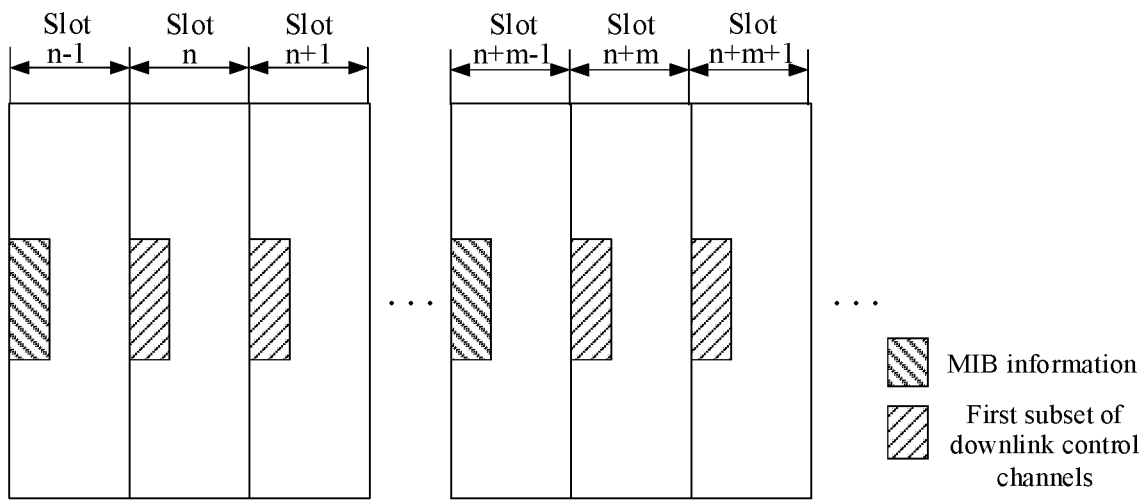
FIG. 2 is a first schematic diagram of a downlink control channel resource set corresponding to a user equipment according to an embodiment of the invention.

FIG. 2 illustrates a first implementation in which the time domain position and/or the frequency domain position of the downlink control channel resource set corresponding to the user equipment is or are determined as follows.

For example, the downlink transmission bandwidth is 100 MHz, so there are 500 frequency domain resource elements in the frequency domain. The preset information of the first frequency domain position of the first subset of downlink control channels is predefined as a fourth frequency domain position occupied by a Physical Broadcast Channel (PBCH) and/or a Primary Synchronization Signal (PSS) and/or a Secondary Synchronization Signal (SSS).

For example, the base station transmits a PBCH and/or a PSS and/or an SSS in a Y MHz bandwidth agreed with the user equipment in the downlink transmission bandwidth, where Y=5, for example, so the user equipment determines a fourth frequency domain position occupied by the Y MHz bandwidth in which a PBCH and/or a PSS and/or an SSS is transmitted, as the third frequency domain position of the downlink control channel resource set corresponding to the user equipment, that is, determines the Y MHz bandwidth in which a PBCH and/or a PSS and/or an SSS is transmitted, as a frequency domain resource set in the downlink control channel resource set corresponding to the user equipment, and receives on the frequency domain resource set a common downlink control channel, or a UE-specific downlink control channel transmitted via scheduling Radio Resource Control (RRC) signaling when the user equipment accesses for the first time, or another downlink control channel needs to be transmitted on the frequency domain resource set corresponding to the third frequency domain position.

Here time domain resources occupied by the first subset of downlink control channel resources are notified in an MIB or predefined in the protocol. Specifically, for example, the base station transmits the MIB information including indication information of the second time domain position of the first subset of downlink control channel resources to the user equipment, where the indication information of the second time domain position indicates the time domain position of the downlink control channel resource set corresponding to the user equipment; and the user equipment can obtain the third time domain position of the downlink control channel resource set corresponding to the user equipment based upon the indication information of the second time domain position.

Alternatively the preset information of the first frequency domain position is predefined as a first preset offset from a fourth frequency domain position occupied by a PBCH and/or a PSS and/or an SSS, so the third frequency domain position for determining the downlink control channel resource set corresponding to the user equipment is obtained based upon the fourth frequency domain position and the first preset offset. For example, the third frequency domain position is a frequency domain position by shifting fourth frequency domain position occupied by a PBCH and/or a PSS and/or an SSS by a first preset offset.

Alternatively a preset size of the first time domain position and a preset start position of the first time domain position of the first subset of downlink control channels are predefined, so the user equipment can obtain the third time domain position of the downlink control channel resource set corresponding to the user equipment.

Figure 3:
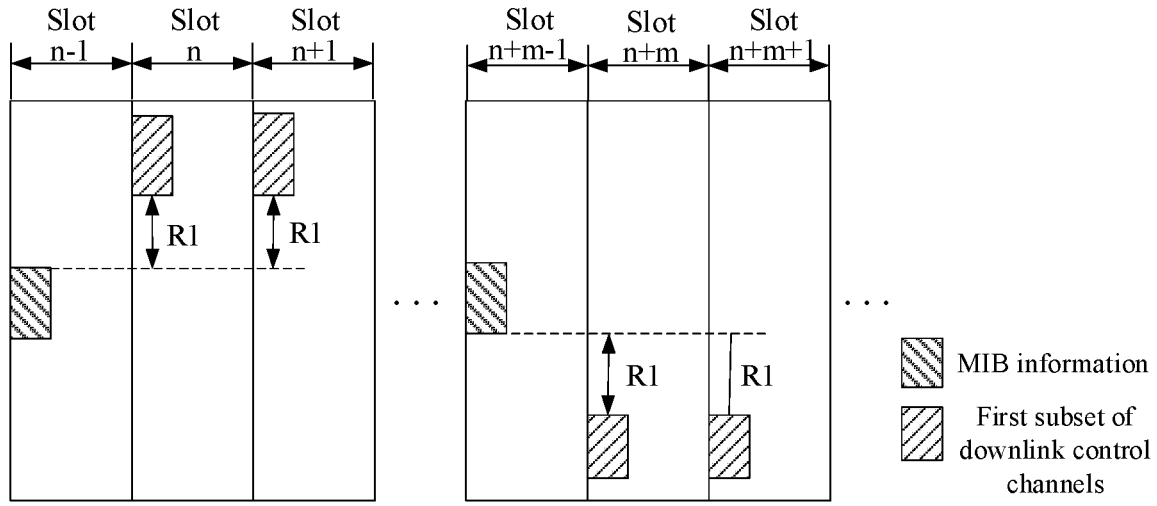
FIG. 3 is a second schematic diagram of a downlink control channel resource set corresponding to a user equipment according to an embodiment of the invention.

FIG. 3 illustrates a second implementation in which the time domain position and/or the frequency domain position of the downlink control channel resource set corresponding to the user equipment is or are determined as follows.

For example, there is a 100 MHz downlink transmission bandwidth, so there are 500 frequency domain resource elements in the frequency domain. For example, the preset information of the first frequency domain position of the first subset of downlink control channel resources is predefined as a fourth frequency domain position occupied by a PBCH and/or a PSS and/or an SSS, and the indication information of the second frequency domain position is indication information indicating a second offset value from the fourth frequency domain position.

Then the base station transmits a PBCH and/or a PSS and/or an SSS in a Y MHz bandwidth agreed with the user equipment in the downlink transmission bandwidth, where Y=5. The user equipment determines a frequency domain resource start position of the downlink control channel resource set corresponding to the user equipment according to the fourth frequency domain position and a second offset value. The second offset value is notified in an MIB, or a predefined offset value R1. The size of the downlink control channel resource set corresponding to the user equipment is notified in an MIB, or the same as a bandwidth occupied by a PBCH and/or a PSS and/or an SSS. The third frequency domain position of the downlink control channel resource set corresponding to the user equipment is determined based on the second offset value and the fourth frequency domain position.

Alike the third time domain position corresponding to the time domain resources occupied by the downlink control channel resource set corresponding to the user equipment is notified in an MIB, or predefined.

Figure 4:
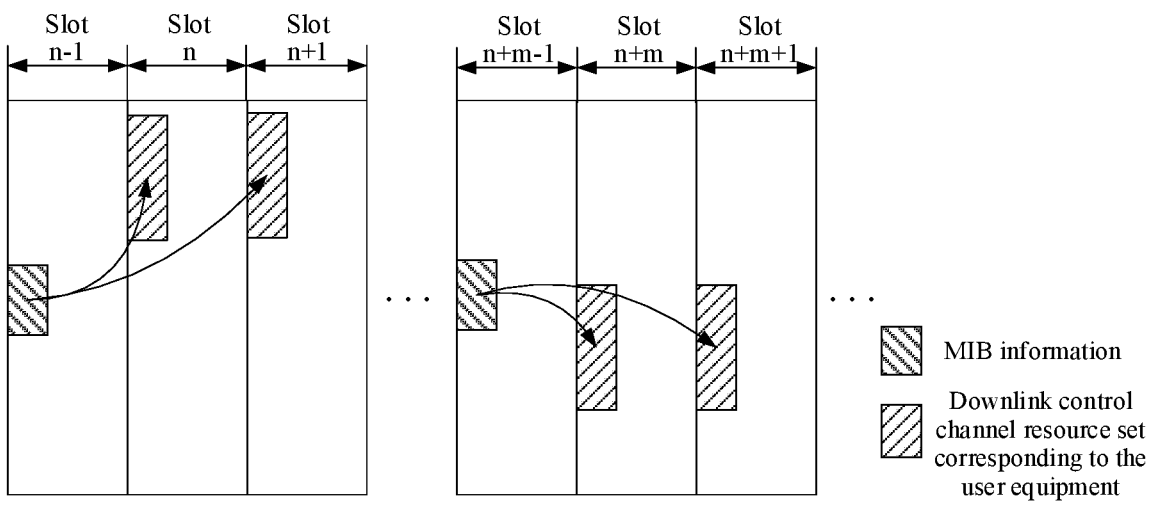
FIG. 4 is a third schematic diagram of a downlink control channel resource set corresponding to a user equipment according to an embodiment of the invention.
Figure 5:
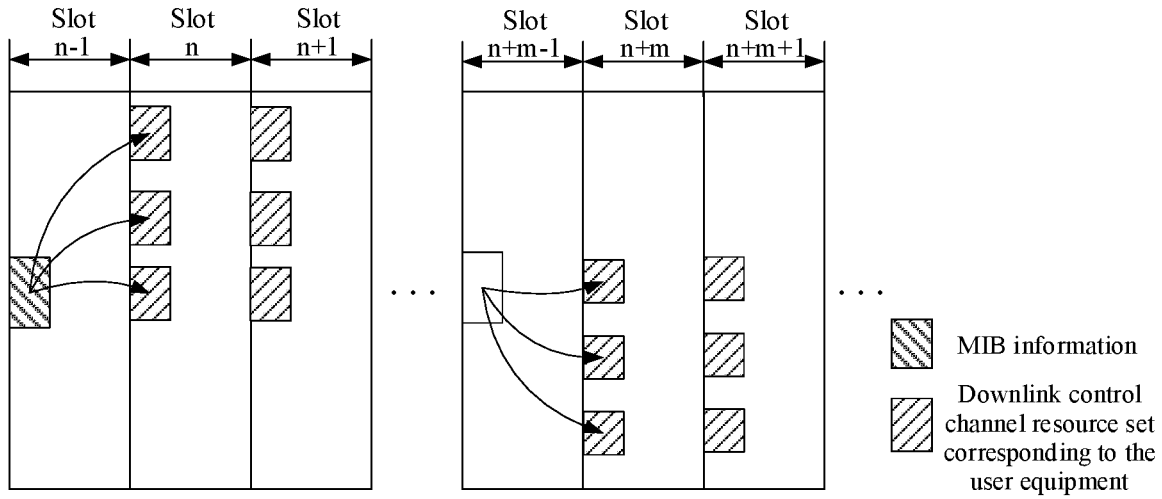
FIG. 5 is a fourth schematic diagram of a downlink control channel resource set corresponding to a user equipment according to an embodiment of the invention.

FIG. 4 and/or FIG. 5 illustrates or illustrate a third implementation in which the time domain position and/or the frequency domain position of the downlink control channel resource set corresponding to the user equipment is or are determined as follows.

For example, there is a 100 MHz downlink transmission bandwidth, so there are 500 frequency domain resource elements in the frequency domain. For example, the base station notifies the user equipment that a resource granularity of the first subset of downlink control channels is N frequency domain resource elements. The base station needs to carry the indication information of the second frequency domain position of P bits in an MIB to indicate a third frequency domain position of the frequency domain resources occupied by the downlink control channel resource set corresponding to the user equipment, and can notify the third frequency domain position of the frequency domain resources occupied by the downlink control channel resource set corresponding to the user equipment specifically as follows without any limitation thereto, where P can be determined specifically in the following two approaches without any limitation thereto.

In a first approach, for example, N=50, there are 500 frequency domain resource elements in total, and the resource granularity is 50, so one bit indicates a resource element, and there are 500/50=10 bits, so that the third frequency domain position of the frequency domain resources occupied by the downlink control channel resource set corresponding to the user equipment shall be notified in P=10 bits. Alternatively P can be determined according to the maximum bandwidth to be indicated, or another preset bandwidth.

In a second approach, for example, N=10, so the third frequency domain position of the frequency domain resources occupied by the downlink control channel resource set corresponding to the user equipment can be notified in ceil(log 2(Q*(Q+1)/2))=ceil(log 2(50*(50+1)/2))= 11 bits, where Q is the resource granularity in the downlink transmission bandwidth.

Upon reception of the MIB information, the user equipment determines the third frequency domain position of the frequency domain resources occupied by the downlink control channel resource set corresponding to the user equipment according to a P-bit indication information field in the MIB information, and receives on the frequency domain resource set corresponding to the third frequency domain position a common downlink control channel, or a UE-specific downlink control channel transmitted via scheduling RRC signaling when the user equipment accesses for the first time, or another downlink control channel which needs to be transmitted on the frequency domain resource set corresponding to the third frequency domain position. Furthermore the frequency domain resource set corresponding to the third frequency domain position indicated in the MIB can be consecutive or discrete in the frequency domain as illustrated in FIG. 4 and/or FIG. 5.

Alike the third time domain position corresponding to the time domain resources occupied by the downlink control channel resource set corresponding to the user equipment can be notified in an MIB, or predefined.

When the first downlink control channel resource set is the second subset of downlink control channels, the time domain and frequency domain positions of the downlink control channel resource set corresponding to the user equipment can be determined as follows.

In a fourth implementation, the time domain position and/or the frequency domain position of the downlink control channel resource set corresponding to the user equipment is or are determined as follows.

For example, there is a 100 MHz downlink transmission bandwidth, so there are 500 frequency domain resource elements in the frequency domain. A frequency domain resource position to be listened by the user equipment is predefined. Specifically a preset of the first frequency domain position and a preset start position of the first frequency domain position of the second subset of downlink control channels are predefined.

For example, the second subset of downlink control channels occupies M*K frequency domain resource elements, where both M and K are positive integers more than or equal to 1, and defined in a protocol. The user equipment obtains a start frequency domain position of the downlink control channel resource set corresponding to the user equipment, and a frequency domain position size occupied by the downlink control channel resource set corresponding to the user equipment, in a predefined manner, and for example, the start frequency domain position of the downlink control channel resource set corresponding to the user equipment is the same as the preset start position of the first frequency domain position, and the frequency domain position size occupied by the downlink control channel resource set corresponding to the user equipment is the same as the preset size of first frequency domain position.

The preset start position of first frequency domain position of the second subset of downlink control channels is determined in the predefined manner as follows without any limitation thereto.

The user equipment determines the start frequency domain position of the second subset of downlink control channels corresponding to the user equipment in the downlink bandwidth according to an RNTI of the user equipment.

Here the time domain resources occupied by the downlink control channel resource set corresponding to the user equipment are notified explicitly via higher-layer signaling, or predefined in the protocol. Specifically, for example the followings.

The third time domain position of the downlink control channel resource set corresponding to the user equipment based upon a preset size of a first time domain position and a preset start position of the first time domain position of the predefined second subset of downlink control channels.

Alternatively the base station transmits higher-layer signaling to the user equipment, where the higher-layer signaling includes indication information of the second time domain position of the second subset of downlink control channels, and the indication information of the second time domain position is indication information indicating the time domain position of the downlink control channel resource set corresponding to the user equipment; and the user equipment can obtain the third time domain position of the downlink control channel resource set corresponding to the user equipment.

Figure 6:
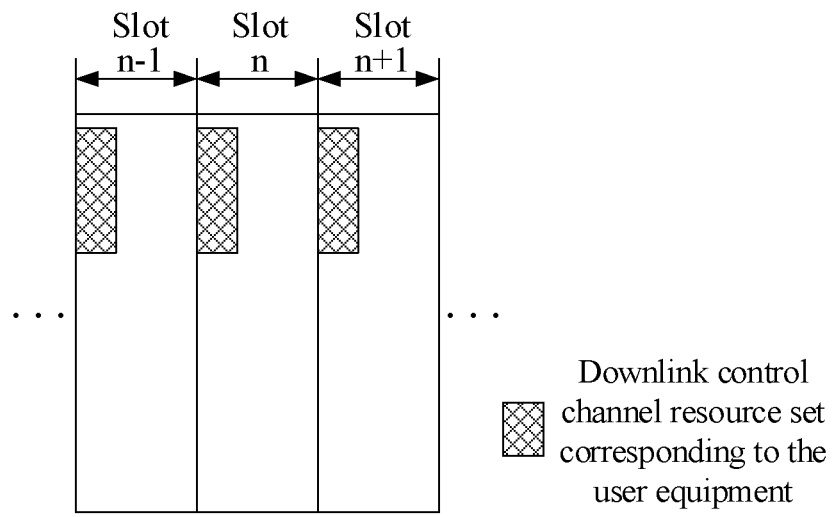
FIG. 6 is a fifth schematic diagram of a downlink control channel resource set corresponding to a user equipment according to an embodiment of the invention.
Figure 7:
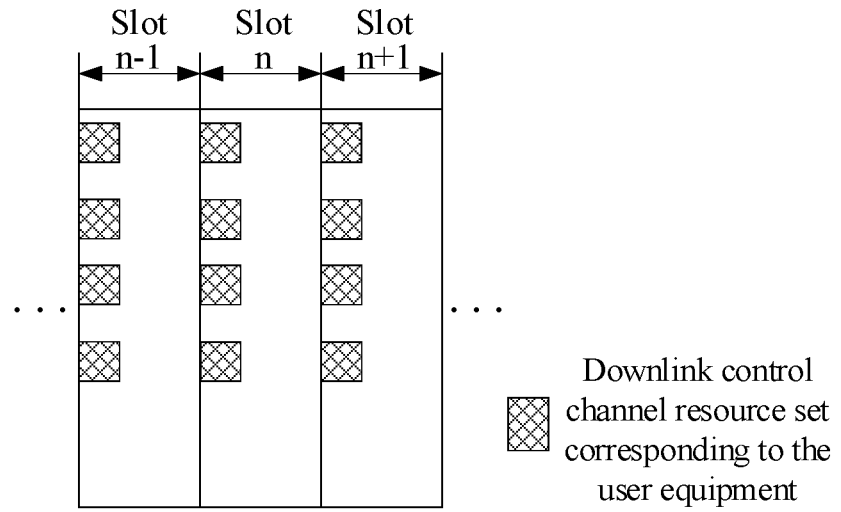
FIG. 7 is a sixth schematic diagram of a downlink control channel resource set corresponding to a user equipment according to an embodiment of the invention.

FIG. 6 and/or FIG. 7 illustrates or illustrate a fifth implementation in which the time domain position and/or the frequency domain position of the downlink control channel resource set corresponding to the user equipment is or are determined as follows.

For example, there is a 100 MHz downlink transmission bandwidth, so there are 500 frequency domain resource elements in the frequency domain. The user equipment can obtain a frequency domain resource position to be listened, according to the indication information of the second frequency domain position of the second subset of downlink control channels carried in higher-layer signaling (e.g., RRC signaling), where the indication information of the second frequency domain position indicates the third frequency domain position of the frequency domain resources occupied by the downlink control channel resource set corresponding to the user equipment. The indication information of the second frequency domain position is represented in P-bit indication information. The P-bit indication information can be parsed in the following implementations without any limitation thereto.

In a first implementation, the P-bit indication information indicates a start frequency domain position of the downlink control channel resource set corresponding to the user equipment, and a frequency domain resource size occupied by the downlink control channel resource set corresponding to the user equipment.

In a second implementation, the P-bit indication information indicates the third frequency domain position of specific frequency domain resources of the downlink control channel resource set corresponding to the user equipment, and for example, the P-bit indication information indicates indication information of element indexes corresponding to frequency domain resource elements occupied by the downlink control channel resource set corresponding to the user equipment, or element group indexes corresponding to frequency domain resource element groups occupied by the downlink control channel resource set corresponding to the user equipment.

Here P can be determined specifically in the following two approaches without any limitation thereto.

In a first approach, for example, N=50, there are 500 frequency domain resource elements in total, and the resource granularity is 50, so one bit indicates a resource element, and there are 500/50=10 bits, so that the third frequency domain position of the frequency domain resources occupied by the downlink control channel resource set corresponding to the user equipment shall be notified in P=10 bits. Alternatively P can be determined according to the maximum bandwidth to be indicated, or another preset bandwidth.

In a second approach, for example, N=10, so the third frequency domain position of the frequency domain resources occupied by the downlink control channel resource set corresponding to the user equipment can be notified in ceil(log 2(Q*(Q+1)/2))=ceil(log 2(50*(50+1)/2))= 11 bits, where Q is the number of the resource granularities in the downlink transmission bandwidth.

The P-bit indication information indicates that the resource granularity of specific frequency domain resources of the downlink control channel resource set corresponding to the user equipment is K RBs, where K is a positive integer more than or equal to 1. It indicates that the specific frequency domain resources of the downlink control channel resource set corresponding to the user equipment are consecutive or discrete in the frequency domain. The user equipment obtains the third frequency domain position of the specific frequency domain resources of the downlink control channel resource set corresponding to the user equipment according to the received P-bit indication information, and receives a downlink control channel for scheduling data transmission, on the resource set. As illustrated in FIG. 6 or FIG. 7, for example, the base station configures the user equipment with the third frequency domain position of the downlink control channel resource set corresponding to the user equipment via higher-layer signaling, where the frequency domain resource set corresponding to the third frequency domain position configured via the higher-layer signaling can be consecutive or discrete in the frequency domain; and the user equipment receives a downlink control channel for scheduling data transmission thereof in the downlink, at the resource position indicated via the higher-layer signaling in a periodicity of high-layer signaling.

Here the time domain resources occupied by the downlink control channel resource set corresponding to the user equipment can be notified explicitly via higher-layer signaling, or predefined in the protocol. Specifically, for example as follows.

A preset size of a first time domain position and a preset start position of the first time domain position of the second subset of downlink control channels are predefined, so the user equipment can obtain the third time domain position of the downlink control channel resource set corresponding to the user equipment.

Alternatively the base station transmits higher-layer signaling to the user equipment, where the higher-layer signaling includes indication information of the second time domain position of the second subset of downlink control channels, and the indication information of the second time domain position is indication information indicating the time domain position of the downlink control channel resource set corresponding to the user equipment; and the user equipment can obtain the third time domain position of the downlink control channel resource set corresponding to the user equipment based upon the indication information of the second time domain position.

Figure 8:
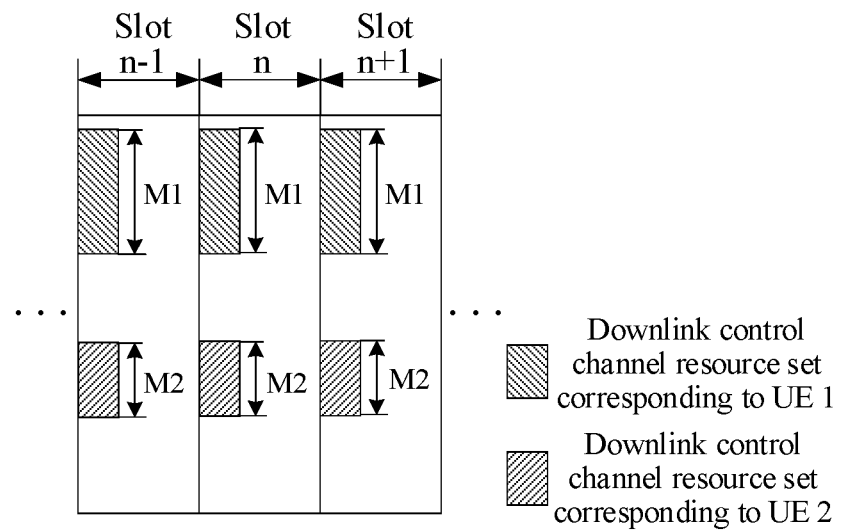
FIG. 8 is a seventh schematic diagram of downlink control channel resource sets corresponding to user equipments according to an embodiment of the invention.

FIG. 8 illustrates a sixth implementation in which the time domain position and/or the frequency domain position of the downlink control channel resource set corresponding to the user equipment is or are determined as follows.

For example, there is a 100 MHz downlink transmission bandwidth, so there are 500 frequency domain resource elements in the frequency domain. The user equipment determines a frequency domain resource position to be listened, in a predefined manner according to the indication information of the second frequency domain position of the second subset of downlink control channels carried in higher-layer signaling, e.g., RRC signaling (without any limitation thereto).

The indication information of the second frequency domain position carried in the RRC signaling includes P bits, and indicates the size of a third frequency domain position occupied by the downlink control channel resource set corresponding to the user equipment in the downlink bandwidth. The predefined manner can be as follows without any limitation thereto.

The user equipment determines a start position of the downlink control channel resource set corresponding to the user equipment in the downlink bandwidth according to an RNTI of the user equipment.

The user equipment obtains a specific frequency domain position of the downlink control channel resource set corresponding to the user equipment in the downlink bandwidth according to the size of the third frequency domain position, occupied by the downlink control channel resource set corresponding to the user equipment in the downlink bandwidth, notified via the RRC signaling, and the start position of the downlink control channel resource set corresponding to the RNTI of the user equipment in the downlink bandwidth. The user equipment receives a downlink control channel for scheduling data transmission, on the resource set. As illustrated in FIG. 8, for example, the base station schedules two user equipments, i.e., the UE 1 and the UE 2, in each slot, and FIG. 8 illustrates a schematic diagram of downlink control channel resource sets of the two user equipments. The sizes of the frequency domain of second subsets of downlink control channels configured for the UE 1 and the UE 2 via higher-layer signaling are M1 and M2 respectively, where M1>M2. The UE 1 and the UE 2 determines frequency domain start positions of the downlink control channel resource sets corresponding to the user equipments according to their RNTIs respectively. As illustrated in FIG. 8, the UE 1 and the UE 2 receive downlink data channels for data transmission thereof in the downlink, in a periodicity of higher-layer signaling according to the sizes of the resource sets notified via higher-layer signaling, and the resource start positions determined by the two user equipments according to their RNTIs.

Alike the time domain resources occupied by the downlink control channel resource set corresponding to the user equipment are notified explicitly via higher-layer signaling, or predefined in the protocol.

As described above, before the user equipment determines the downlink control channel resource set corresponding to the user equipment as the third downlink control channel resource set, the base station has determined the resource position at which the base station transmits the downlink control channel resource set, so the base station can transmit the corresponding downlink control channel on the resource set determined by the base station, and the user equipment can also receive the downlink control channel corresponding to the user equipment on the resource set corresponding to the user equipment.

Figure 9:
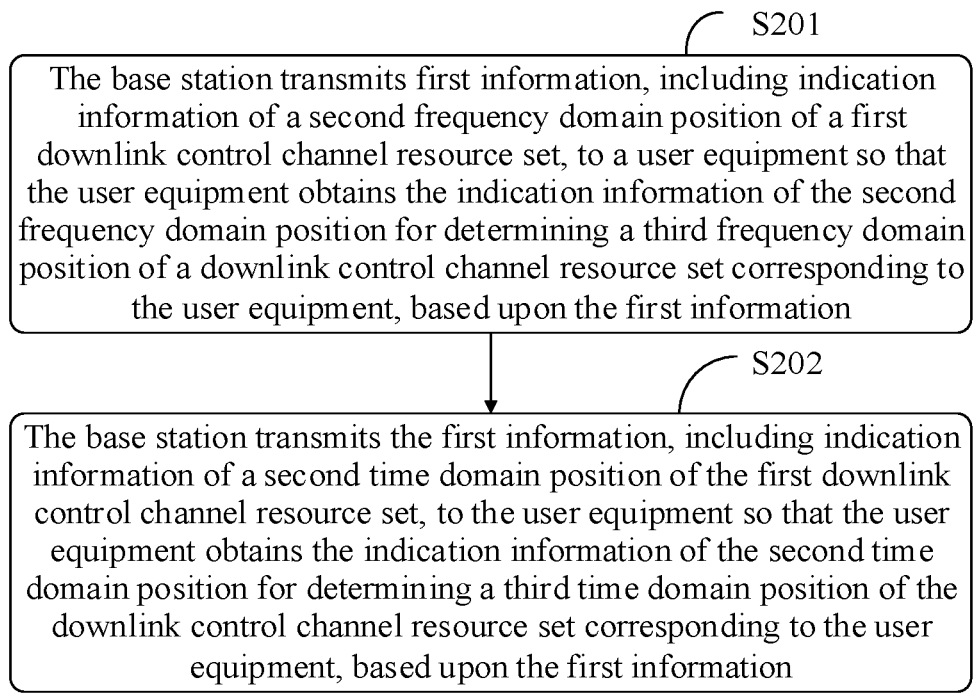
FIG. 9 is a schematic flow chart of a method for transmitting resource position information of a downlink control channel resource set in a base station according to an embodiment of the invention.

As illustrated in FIG. 9, a method for transmitting resource position information of a downlink control channel resource set in a base station according to a second embodiment of the invention includes the following steps.

In the step S201, the base station transmits first information, including indication information of the second frequency domain position of a first downlink control channel resource set, to a user equipment so that the user equipment obtains the indication information of the second frequency domain position for determining a third frequency domain position of a downlink control channel resource set corresponding to the user equipment, based upon the first information.

Alternatively and additionally, in the step S202, the base station transmits the first information, including indication information of the second time domain position of the first downlink control channel resource set, to the user equipment so that the user equipment obtains the indication information of the second time domain position for determining a third time domain position of the downlink control channel resource set corresponding to the user equipment, based upon the first information.

The steps 201 and S202 above can be performed concurrently or in a reversed order. For example, when the same first information includes both the indication information of the second frequency domain position of the first downlink control channel resource set, and the indication information of the second time domain position of the first downlink control channel resource set, the base station can transmit to user equipment both a third time domain position of the downlink control channel resource set corresponding to the user equipment, and a third frequency domain position of the downlink control channel resource set corresponding to the user equipment. Accordingly the steps 201 and S202 specifically can be performed concurrently or in a reversed order dependent upon timing at which the base station executes corresponding program in software and/or hardware, although the embodiment of the invention will not be limited thereto.

The time domain and frequency domain positions of the downlink control channel resource set corresponding to the user equipment can be transmitted in a number of the following specific implementations dependent upon different downlink control channels transmitted on the first downlink control channel resource set.

When the first downlink control channel resource set is a first subset of downlink control channels for transmitting a common downlink control channel, and/or the first downlink control channel resource set is configured for transmitting a UE-specific downlink control channel when the user equipment accesses a mobile communication network for the first time, where the first information is MIB information or SI, the base station can carry related information in the MIB information or the SI transmitted to the user equipment so that the user equipment can obtain the second time domain and/or frequency domain position indication information for determining the third time domain position and/or the frequency domain position of the downlink control channel resource set corresponding to the user equipment; and for example, the first information is MIB information hereinafter, but will not be limited to MIB information or SI.

The first downlink control channel resource set is a second sub-set of downlink control channels for transmitting a UE-specific downlink control channel, where the first information is higher-layer signaling, and the base station can carry related information in the higher-layer signaling transmitted to the user equipment so that the user equipment can obtain the second time domain and/or frequency domain position indication information for determining the third time domain position and/or the frequency domain position of the downlink control channel resource set corresponding to the user equipment.

When the first downlink control channel resource set is the first subset of downlink control channels: the indication information of the second frequency domain position can be embodied in the following two implementations without any limitation thereto.

The indication information of the second frequency domain position indicates the second frequency domain position directly; or when a first preset frequency domain position corresponding to the user equipment is predefined, the indication information of the second frequency domain position indicates a first preset offset value of the second frequency domain position from the first preset frequency domain position.

The indication information of the second time domain position indicates the second time domain position directly.

When the first downlink control channel resource set is the second subset of downlink control channels: the indication information of the second frequency domain position can be embodied in the following two implementations without any limitation thereto.

The indication information of the second frequency domain position indicates the second frequency domain position directly; or when a first preset start frequency domain position corresponding to the user equipment is predefined, the indication information of the second frequency domain position indicates the size of the second frequency domain position.

The indication information of the second time domain position indicates the second time domain position directly.

After the user equipment obtains the second time domain and/or frequency domain position indication information transmitted by the base station, the user equipment obtains the third frequency domain position for determining the downlink control channel resource set corresponding to the user equipment, based upon the indication information of the second frequency domain position, and/or predefined preset information of the first frequency domain position, and the user equipment obtains the third time domain position for determining the downlink control channel resource set corresponding to the user equipment, based upon the indication information of the second time domain position, and/or predefined preset information of the first time domain; and the user equipment determines the downlink control channel resource set corresponding to the user equipment as a third downlink control channel resource set based upon the third time domain position and the third frequency domain position.

The base station transmits a corresponding downlink control channel on the downlink control channel resource set corresponding to the user equipment.

In the case above, for example, the position of the downlink control channel resource set has been specified in a communication protocol, and shall be complied by both the base station and the user equipment, so the base station has determined a resource set to be occupied by the base station for transmitting a downlink control channel, based upon position information of a time domain resource and frequency domain resource set specified in the protocol, and at this time, if the resource set is specified in the protocol and remains unchanged, then the base station may not notify the user equipment, so the user equipment can determine by itself a specific position of the resource set based upon the resource set specified in the protocol (where the resource set refers to a time domain resource and/or the frequency domain resource set).

If the base station newly determines a resource set to be occupied by the base station for transmitting a downlink control channel (where the resource set refers to a time domain and/or frequency domain resource set), based upon position information of a time domain resource and frequency domain resource set specified in the protocol, for example, the base station determines that there is an offset value of a resource set to be occupied by the base station for transmitting a downlink control channel, from the resource set specified in the protocol, then the base station notifies the user equipment of the offset value from the resource set specified in the protocol so that the user equipment determines the specific position of the downlink resource set corresponding to the user equipment based upon the notified offset value.

If the base station determines by itself the position of a resource set to be occupied by the base station for transmitting a downlink control channel (where the resource set refers to a time domain and/or frequency domain resource set), then the base station notifies the user equipment of the determined position of the resource set so that the user equipment determines the specific position of the downlink resource set corresponding to the user equipment based upon the notified position.

In this way, the base station can transmit the corresponding downlink control channel on the resource set determined by the base station, and the user equipment can also obtain the specific position of the resource set corresponding to the user equipment so that the user equipment receives the downlink control channel corresponding to the user equipment on the resource set corresponding to the user equipment.

Figure 10:
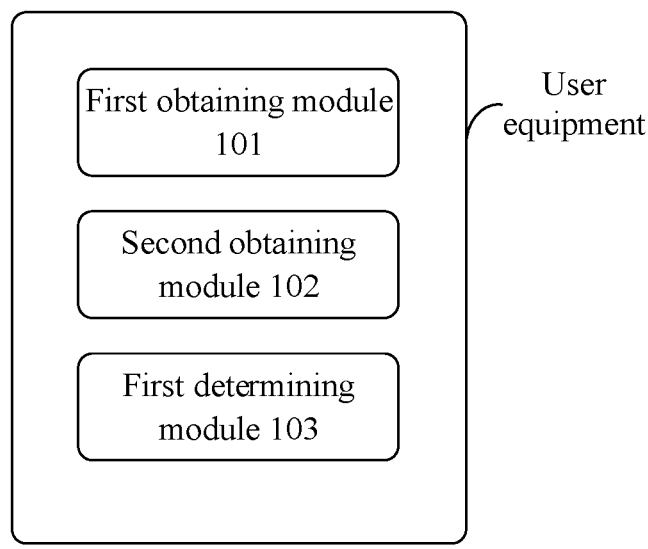
FIG. 10 is a schematic structural diagram of a user equipment according to an embodiment of the invention.

As illustrated in FIG. 10, a user equipment according to a third embodiment of the invention includes the following modules.

A first obtaining module 101 is configured to obtain a third frequency domain position for determining a downlink control channel resource set corresponding to the user equipment, based upon preset information of the first frequency domain position of a predefined first downlink control channel resource set, and/or based upon received first information, transmitted by a base station, including indication information of the second frequency domain position of the first downlink control channel resource set.

A second obtaining module 102 is configured to obtain a third time domain position for determining the downlink control channel resource set corresponding to the user equipment, based upon preset information of the first time domain position of the predefined first downlink control channel resource set, and/or based upon the received first information, transmitted by the base station, including indication information of the second time domain position of the first downlink control channel resource set.

A first determining module 103 is configured to determine the downlink control channel resource set corresponding to the user equipment as a third downlink control channel resource set based upon the third frequency domain position and the third time domain position.

For example, the preset information of the first frequency domain position of the predefined first downlink control channel resource set, and the preset information of the first time domain position of the predefined first downlink control channel resource set has been specified in a communication protocol, and shall be complied by both the base station and the user equipment, so the base station has determined a resource set to be occupied by the base station for transmitting a downlink control channel, for example, in the following three instances without any limitation thereto (only by way of an example), before the user determine determines the downlink control channel resource set corresponding to the user equipment.

In a first instance, for example, the base station has determined a resource set to be occupied by the base station for transmitting a downlink control channel, based upon position information of a time domain and frequency domain resource set specified in a protocol, and at this time, if the resource set is specified in the protocol and remains unchanged, then the base station will not notify the user equipment, so the user equipment can determine by itself a specific position of the resource set based upon the resource set specified in the protocol (where the resource set refers to a time domain and/or frequency domain resource set).

In a second instance, if the base station newly determines a resource set to be occupied by the base station for transmitting a downlink control channel (where the resource set refers to a time domain and/or frequency domain resource set), based upon position information of a time domain and frequency domain resource set specified in the protocol, for example, the base station determines that there is an offset value for a resource set to be occupied by the base station for transmitting a downlink control channel, from the resource set specified in the protocol, then the base station notifies the user equipment of the offset value from the resource set specified in the protocol so that the user equipment determines the specific position of the downlink resource set corresponding to the user equipment based upon the notified offset value.

In a third instance, if the base station determines by itself the position of a resource set to be occupied by the base station for transmitting a downlink control channel (where the resource set refers to a time domain and/or frequency domain resource set), then the base station notifies the user equipment of the determined position of the resource set so that the user equipment determines the specific position of the downlink resource set corresponding to the user equipment based upon the notified position.

In this way, the base station can transmit the corresponding downlink control channel on the resource set determined by the base station, and the user equipment can also obtain the specific position of the resource set corresponding to the user equipment so that the user equipment receives the downlink control channel corresponding to the user equipment on the resource set corresponding to the user equipment. The first obtaining module and the second obtaining module in the user equipment can determine the time domain and frequency domain positions of the downlink control channel resource set corresponding to the user equipment can be determined in a number of the following particular implementations dependent upon different downlink control channels transmitted on the first downlink control channel resource set.

When the first downlink control channel resource set is a first subset of downlink control channels for transmitting a common downlink control channel, and/or the first downlink control channel resource set is configured for transmitting a UE-specific downlink control channel when the user equipment accesses a mobile communication network for the first time, the time and frequency domain positions of the downlink control channel resource set corresponding to the user equipment are determined, where the first information is MIB information or SI, and the user equipment can obtain the time domain position and/or the frequency domain position of the downlink control channel resource set corresponding to the user equipment according to related information carried in the MIB information or the SI; and for example, the first information will be MIB information hereinafter, but will not be limited to MIB information or SI.

The first downlink control channel resource set is a second sub-set of downlink control channels for transmitting a UE-specific downlink control channel, where the first information is higher-layer signaling, and the user equipment can obtain the time domain position and/or the frequency domain position of the downlink control channel resource set corresponding to the user equipment according to related information carried in the higher-layer signaling.

When the first downlink control channel resource set is the first subset of downlink control channels, the time domain position and/or the frequency domain position of the downlink control channel resource set corresponding to the user equipment can be determined as follows (particularly as illustrated in FIG. 2 to FIG. 5).

In a first implementation, the first obtaining module 101 includes a first obtaining sub-module or a second obtaining sub-module.

For example, there is a 100 MHz downlink transmission bandwidth, so there are 500 frequency domain resource elements in the frequency domain. The preset information of the first frequency domain position of the first subset of downlink control channels is predefined as a fourth frequency domain position occupied by a PBCH and/or a PSS and/or an SSS.

For example, the base station transmits a PBCH and/or a PSS and/or an SSS in a Y MHz bandwidth agreed with the user equipment in the downlink transmission bandwidth, where Y=5, for example, so the first obtaining sub-module in the user equipment determines a fourth frequency domain position occupied by the Y MHz bandwidth in which a PBCH and/or a PSS and/or an SSS is transmitted, as the third frequency domain position of the downlink control channel resource set corresponding to the user equipment, that is, determines the Y MHz bandwidth in which a PBCH and/or a PSS and/or an SSS is transmitted, as a frequency domain resource set of downlink control channel resource set corresponding to the user equipment, and receives on the frequency domain resource set a common downlink control channel, or a UE-specific downlink control channel transmitted via scheduling RRC signaling when the user equipment accesses for the first time, or another downlink control channel which needs to be transmitted on the frequency domain resource set corresponding to the third frequency domain position.

Alternatively the preset information of the first frequency domain position is predefined as a first preset offset value from a fourth frequency domain position occupied by a PBCH and/or a PSS and/or an SSS, so the second obtaining sub-module is configured to obtain the third frequency domain position for determining the downlink control channel resource set corresponding to the user equipment, based upon the fourth frequency domain position and the first preset offset value. For example, the third frequency domain position is a frequency domain position by shifting the fourth frequency domain position occupied by a PBCH and/or a PSS and/or an SSS by a first preset offset value.

Here time domain resources occupied by the first subset of downlink control channel resources are notified in an MIB or predefined in the protocol. Specifically, for example, the base station transmits the MIB information including indication information of the second time domain position of the first subset of downlink control channel resources to the user equipment, and a seventh obtaining sub-module in the first obtaining module of the user equipment is configured to obtain the indication information of the second time domain position, where the indication information of the second time domain position indicates the time domain position of the downlink control channel resource set corresponding to the user equipment; and an eighth obtaining sub-module in the first obtaining module of the user equipment is configured to obtain the third time domain position of the downlink control channel resource set corresponding to the user equipment based upon the indication information of the second time domain position.

Alternatively a ninth obtaining sub-module in the first obtaining module of the user equipment is configured to obtain the third time domain position of the downlink control channel resource set corresponding to the user equipment based upon a preset size of the first time domain position and a preset start position of first time domain position of the predefined first subset of downlink control channels.

In a second implementation, the first obtaining module in the user equipment includes a third obtaining sub-module and a fourth obtaining sub-module.

For example, there is a 100 MHz downlink transmission bandwidth, so there are 500 frequency domain resource elements in the frequency domain. For example, the preset information of the first frequency domain position of the first subset of downlink control channels is predefined as a fourth frequency domain position occupied by a PBCH and/or a PSS and/or an SSS, and the indication information of the second frequency domain position is indication information indicating a second offset value from the fourth frequency domain position.

Then the base station transmits a PBCH and/or a PSS and/or an SSS in a Y MHz bandwidth agreed with the user equipment in the downlink transmission bandwidth, where Y=5. The third obtaining sub-module in the user equipment is configured to obtain the indication information of the second frequency domain position of the first downlink control channel resource set based upon the received first information, transmitted by the base station, including the indication information of the second frequency domain position, and the fourth obtaining sub-module in the user equipment is configured to determine a frequency domain resource start position of the downlink control channel resource set corresponding to the user equipment according to the fourth frequency domain position and a second offset value. The second offset value is notified in an MIB, or a predefined offset value R1.

The size of the downlink control channel resource set corresponding to the user equipment is notified in an MIB, or the same as a bandwidth occupied by a PBCH and/or a PSS and/or an SSS. The third frequency domain position of the downlink control channel resource set corresponding to the user equipment is determined based upon the second offset value, and the frequency domain resource size of the downlink control channel resource set corresponding to the user equipment.

Alike the third time domain position corresponding to the time domain resources occupied by the downlink control channel resource set corresponding to the user equipment is notified in an MIB, or predefined.

In a third implementation, the first obtaining module includes a fifth obtaining sub-module and a sixth obtaining sub-module.

For example, there is a 100 MHz downlink transmission bandwidth, so there are 500 frequency domain resource elements in the frequency domain. For example, the base station notifies the user equipment that a resource granularity of the first subset of downlink control channels is N frequency domain resource elements. The base station needs to carry the indication information of the second frequency domain position of P bits in an MIB to indicate a third frequency domain position of the frequency domain resources occupied by the downlink control channel resource set corresponding to the user equipment, and can notify the third frequency domain position of the frequency domain resources occupied by the downlink control channel resource set corresponding to the user equipment particularly as follows without any limitation thereto, and the fifth obtaining sub-module in the user equipment is configured to obtain the P-bit indication information of the second frequency domain position of the first downlink control channel resource set based upon the received MIB information, transmitted by the base station, including the indication information of the second frequency domain position, where P can be determined particularly in the following two approaches without any limitation thereto.

In a first approach, for example, N=50, there are 500 frequency domain resource elements in total, and the resource granularity is 50, so a bit indicates a resource element, and there are 500/50=10 bits, so that the third frequency domain position of the frequency domain resources occupied by the downlink control channel resource set corresponding to the user equipment shall be notified in P=10 bits. Alternatively P can be determined according to the maximum bandwidth to be indicated, or another preset bandwidth.

In a second approach, for example, N=10, so the third frequency domain position of the frequency domain resources occupied by the downlink control channel resource set corresponding to the user equipment can be notified in ceil(log 2(Q*(Q+1)/2))=ceil(log 2(50*(50+1)/2))= 11 bits, where Q is the number of resource granularities in the downlink transmission bandwidth.

Upon reception of the MIB information, the sixth obtaining sub-module in the user equipment is configured to determine the third frequency domain position of the frequency domain resources occupied by the downlink control channel resource set corresponding to the user equipment according to a P-bit indication information field in the MIB information, and to receive on the frequency domain resource set corresponding to the third frequency domain position a common downlink control channel, or a UE-specific downlink control channel transmitted via scheduling RRC signaling when the user equipment accesses for the first time, or another downlink control channel transmitted on the frequency domain resource set corresponding to the third frequency domain position. Furthermore the frequency domain resource set corresponding to the third frequency domain position indicated in the MIB can be consecutive or discrete in the frequency domain as illustrated in FIG. 4 and/or FIG. 5.

Alike the third time domain position corresponding to the time domain resources occupied by the downlink control channel resource set corresponding to the user equipment can be notified in an MIB, or predefined.

When the first downlink control channel resource set is the second subset of downlink control channels, the first information is higher-layer signaling, and the time domain and frequency domain positions of the downlink control channel resource set corresponding to the user equipment can be determined as follows.

In a fourth implementation, the user equipment includes a tenth obtaining sub-module, and for example, there is a 100 MHz downlink transmission bandwidth, so there are 500 frequency domain resource elements in the frequency domain. Particularly a preset size of the first frequency domain position and a preset start position of first frequency domain position of the second subset of downlink control channels are predefined.

For example, the second subset of downlink control channels occupies M*K frequency domain resource elements, where both M and K are positive integers more than or equal to 1, and defined in a protocol. The user equipment obtains a start frequency domain position of the set of s corresponding to the user equipment, and a frequency domain position size occupied by the downlink control channel resource set corresponding to the user equipment, in a predefined manner, and for example, the start frequency domain position of the downlink control channel resource set corresponding to the user equipment is the same as the preset start position of first frequency domain position, and the frequency domain position size occupied by the downlink control channel resource set corresponding to the user equipment is the same as the preset size of the first frequency domain position.

The preset start position of first frequency domain position of the second subset of downlink control channels can be determined in the predefined manner as follows without any limitation thereto.

The user equipment determines the start frequency domain position of the second subset of downlink control channels corresponding to the user equipment in the downlink bandwidth according to an RNTI of the user equipment.

Here the time domain resources occupied by the downlink control channel resource set corresponding to the user equipment are notified explicitly via higher-layer signaling, or predefined in the protocol. Particularly, for example as follows.

The second obtaining module includes a fifteenth obtaining sub-module configured to obtain the third time domain position of the downlink control channel resource set corresponding to the user equipment based upon a preset size of a first time domain position and a preset start position of the first time domain position of the predefined second subset of downlink control channels.

Alternatively the second obtaining module includes a sixteenth obtaining sub-module and a seventeenth obtaining sub-module, the base station transmits higher-layer signaling to the user equipment, and the sixteenth obtaining sub-module obtains the higher-layer signaling including indication information of the second time domain position of the second subset of downlink control channels, and the indication information of the second time domain position is indication information indicating the time domain position of the downlink control channel resource set corresponding to the user equipment; and the seventeenth obtaining sub-module is configured to obtain the third time domain position of the downlink control channel resource set corresponding to the user equipment.

In a fifth implementation, the first obtaining module in the user equipment includes an eleventh obtaining sub-module and a twelfth obtaining sub-module.

For example, there is a 100 MHz downlink transmission bandwidth, so there are 500 frequency domain resource elements in the frequency domain. The user equipment can obtain a frequency domain resource position to be listened, according to the indication information of the second frequency domain position of the second subset of downlink control channels carried in higher-layer signaling (e.g., RRC signaling), where the indication information of the second frequency domain position indicates the third frequency domain position of the frequency domain resources occupied by the downlink control channel resource set corresponding to the user equipment, that is, the eleventh obtaining sub-module in the user equipment obtains the indication information of the second frequency domain position, and the indication information of the second frequency domain position is indication information indicating the frequency domain position of the downlink control channel resource set corresponding to the user equipment. The indication information of the second frequency domain position is represented in P-bit indication information. The P-bit indication information can be parsed in the following implementations without any limitation thereto.

In a first implementation, the P-bit indication information indicates a start frequency domain position of the downlink control channel resource set corresponding to the user equipment, and a frequency domain resource size occupied by the downlink control channel resource set corresponding to the user equipment.

In a second implementation, the P-bit indication information indicates the third frequency domain position of specific frequency domain resources of the downlink control channel resource set corresponding to the user equipment, and for example, the P-bit indication information indicates indication information of element indexes corresponding to frequency domain resource elements occupied by the downlink control channel resource set corresponding to the user equipment, or element group indexes corresponding to frequency domain resource element groups occupied by the downlink control channel resource set corresponding to the user equipment.

Here P can be determined specifically in the following two approaches without any limitation thereto.

In a first approach, for example, N=50, there are 500 frequency domain resource elements in total, and the resource granularity is 50, so a bit indicates a resource element, and there are 500/50=10 bits, so that the third frequency domain position of the frequency domain resources occupied by the downlink control channel resource set corresponding to the user equipment shall be notified in P=10 bits. Alternatively P can be determined according to the maximum bandwidth to be indicated, or another preset bandwidth.

In a second approach, for example, N=10, so the third frequency domain position of the frequency domain resources occupied by the downlink control channel resource set corresponding to the user equipment can be notified in ceil(log 2(Q*(Q+1)/2))=ceil(log 2(50*(50+1)/2))= 11 bits, where Q is the number of resource granularities in the downlink transmission bandwidth.

The P-bit indication information indicates that the resource granularity of specific frequency domain resources of the downlink control channel resource set corresponding to the user equipment is K RBs, where K is a positive integer more than or equal to 1. It indicates that the specific frequency domain resources of the downlink control channel resource set corresponding to the user equipment are consecutive or discrete in the frequency domain. The twelfth obtaining sub-module in the user equipment is configured to obtain the third frequency domain position of the specific frequency domain resources of the downlink control channel resource set corresponding to the user equipment according to the received P-bit indication information, and to receive a downlink control channel for scheduling data transmission, on the resource set. As illustrated in FIG. 6 or FIG. 7, for example, the base station configures the user equipment with the third frequency domain position of the downlink control channel resource set corresponding to the user equipment via higher-layer signaling, where the frequency domain resources corresponding to the third frequency domain position configured via the higher-layer signaling can be consecutive or discrete in the frequency domain; and the user equipment receives a downlink control channel for scheduling data transmission thereof in the downlink, at the resource position indicated via the higher-layer signaling in a periodicity of high-layer signaling.

Here the time domain resources occupied by the downlink control channel resource set corresponding to the user equipment can be notified explicitly via higher-layer signaling, or predefined in the protocol. Particularly, for example as follows.

In a sixth implementation, the first obtaining module in the user equipment includes a thirteenth obtaining sub-module and a fourteenth obtaining sub-module.

For example, there is a 100 MHz downlink transmission bandwidth, so there are 500 frequency domain resource elements in the frequency domain. The thirteenth obtaining sub-module is configured to obtain the indication information of the second frequency domain position of the second subset of downlink control channels carried in higher-layer signaling, e.g., RRC signaling (without any limitation thereto) in a predefined manner, and the fourteenth obtaining sub-module is configured to determine a frequency domain resource position to be listened by the user equipment, based upon the indication information and predefined information.

The indication information of the second frequency domain position carried in the RRC signaling includes P bits, and indicates the size of a third frequency domain position occupied by the downlink control channel resource set corresponding to the user equipment in the downlink bandwidth. The predefined manner can be as follows without any limitation thereto.

The user equipment determines a start position of the downlink control channel resource set corresponding to the user equipment in the downlink bandwidth according to an RNTI of the user equipment.

The fourteenth obtaining sub-module in the user equipment is configured to obtain a specific frequency domain position of the downlink control channel resource set corresponding to the user equipment in the downlink bandwidth according to the size of the third frequency domain position, occupied by the downlink control channel resource set corresponding to the user equipment in the downlink bandwidth, notified via the RRC signaling, and the start position of the downlink control channel resource set corresponding to the RNTI of the user equipment in the downlink bandwidth, and to receive a downlink control channel for scheduling data transmission, on the resource set. As illustrated in FIG. 8, for example, the base station schedules two user equipments, i.e., the UE 1 and the UE 2, in each slot, and FIG. 8 illustrates a schematic diagram of downlink control channel resource sets of the two user equipments. The sizes in the frequency domain of second subsets of downlink control channels configured for the UE 1 and the UE 2 via higher-layer signaling are M1 and M2 respectively, where M1>M2. The UE 1 and the UE 2 determines frequency domain start positions of the downlink control channel resource sets corresponding to the user equipments according to their RNTIs respectively. As illustrated in FIG. 8, the UE 1 and the UE 2 receive downlink data channels for data transmission thereof in the downlink, in a periodicity of higher-layer signaling according to the sizes of the resource sets notified via higher-layer signaling, and the resource start positions determined by the two user equipments according to their RNTIs.

Alike the time domain resources occupied by the downlink control channel resource set corresponding to the user equipment are notified explicitly via higher-layer signaling, or predefined in the protocol.

As described above, before the user equipment determines the downlink control channel resource set corresponding to the user equipment as the third downlink control channel resource set, the base station has determined the resource position at which the base station transmits the downlink control channel resource set, so the base station can transmit the corresponding downlink control channel on the resource set determined by the base station, and the user equipment can also receive the downlink control channel corresponding to the user equipment on the resource set corresponding to the user equipment.

A fourth embodiment of the invention provides a base station including the following modules.

A first transmitting module is configured to transmit first information, including indication information of the second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or to transmit the first information, including indication information of the second time domain position of the first downlink control channel resource set, to the user equipment so that the user equipment obtains the indication information of the second time domain position for determining a third time domain position of the downlink control channel resource set corresponding to the user equipment, based upon the first information.

Here the time domain and frequency domain positions of the downlink control channel resource set corresponding to the user equipment can be transmitted in a number of the following specific implementations dependent upon different downlink control channels transmitted on the first downlink control channel resource set.

When the first downlink control channel resource set is a first subset of downlink control channels for transmitting a common downlink control channel, and/or the first downlink control channel resource set is configured for transmitting a UE-specific downlink control channel when the user equipment accesses a mobile communication network for the first time, where the first information is MIB information or SI, the base station can carry related information in the MIB information or the SI transmitted to the user equipment so that the user equipment can obtain the second time domain and/or frequency domain position indication information for determining the third time domain position and/or the frequency domain position of the downlink control channel resource set corresponding to the user equipment; and for example, the first information will be MIB information hereinafter, but will not be limited to MIB information or SI.

The first downlink control channel resource set o is a second sub-set of downlink control channels for transmitting a UE-specific downlink control channel, where the first information is higher-layer signaling, and the base station can carry related information in the higher-layer signaling transmitted to the user equipment so that the user equipment can obtain the second time domain and/or frequency domain position indication information for determining the third time domain position and/or the frequency domain position of the downlink control channel resource set corresponding to the user equipment.

When the first downlink control channel resource set is the first subset of downlink control channels, the indication information of the second frequency domain position can be embodied in the following two implementations without any limitation thereto.

The indication information of the second frequency domain position indicates the second frequency domain position directly; or when a first preset frequency domain position corresponding to the user equipment is predefined, the indication information of the second frequency domain position indicates a first preset offset value of the second frequency domain position from the first preset frequency domain position.

The indication information of the second time domain position indicates the second time domain position directly.

When the first downlink control channel resource set is the second subset of downlink control channels, the indication information of the second frequency domain position can be embodied in the following two implementations without any limitation thereto.

The indication information of the second frequency domain position indicates the second frequency domain position directly; or when a first preset start frequency domain position corresponding to the user equipment is predefined, the indication information of the second frequency domain position indicates the size of the second frequency domain position.

The indication information of the second time domain position indicates the second time domain position directly.

After the user equipment obtains the second time domain and/or frequency domain position indication information transmitted by the base station, the user equipment obtains the third frequency domain position for determining the downlink control channel resource set corresponding to the user equipment, based upon the indication information of the second frequency domain position, and/or predefined preset information of the first frequency domain position, and the user equipment obtains the third time domain position for determining the downlink control channel resource set corresponding to the user equipment, based upon the indication information of the second time domain position, and/or predefined preset information of the first time domain; and the user equipment determines the downlink control channel resource set corresponding to the user equipment as a third downlink control channel resource set based upon the third time domain position and the third frequency domain position.

The base station transmits a corresponding downlink control channel on the downlink control channel resource set corresponding to the user equipment.

In the case above, for example, the position of the downlink control channel resource set has been specified in a communication protocol, and shall be complied by both the base station and the user equipment, so the base station has determined a resource set to be occupied by the base station for transmitting a downlink control channel, based upon position information of a time domain and frequency domain resource set specified in the protocol, and at this time, if the resource set is specified in the protocol and remains unchanged, then the base station will not notify the user equipment, so the user equipment can determine by itself a specific position of the resource set based upon the resource set specified in the protocol (where the resource set refers to a time domain and/or frequency domain resource set).

If the base station newly determines a resource set to be occupied by the base station for transmitting a downlink control channel (where the resource set refers to a time domain and/or frequency domain resource set), based upon position information of a time domain and frequency domain resource set specified in the protocol, for example, the base station determines that there is an offset value of a resource set to be occupied by the base station for transmitting a downlink control channel, from the resource set specified in the protocol, then the base station will notify the user equipment of the offset value from the resource set specified in the protocol so that the user equipment determines the specific position of the downlink resource set corresponding to the user equipment based upon the notified offset value.

If the base station determines by itself the position of a resource set to be occupied by the base station for transmitting a downlink control channel (where the resource set refers to a time domain and/or frequency domain resource set), then the base station will notify the user equipment of the determined position of the resource set so that the user equipment determines the specific position of the downlink resource set corresponding to the user equipment based upon the notified position.

In this way, the base station can transmit the corresponding downlink control channel on the resource set determined by the base station, and the user equipment can also obtain the specific position of the resource set corresponding to the user equipment so that the user equipment receives the downlink control channel corresponding to the user equipment on the resource set corresponding to the user equipment.

Figure 11:
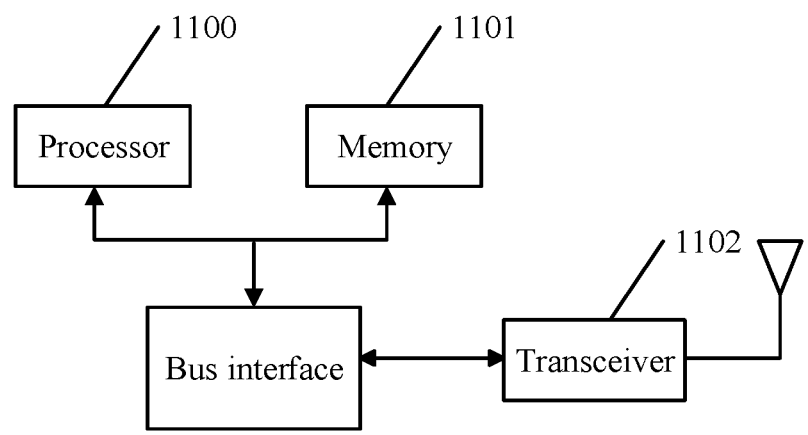
FIG. 11 is a schematic structural diagram of another user equipment according to an embodiment of the invention.

As illustrated in FIG. 11, another user equipment according to an embodiment of the invention includes: a processor 1100, a memory 1101, and a transceiver 1102.

The processor 1100 is responsible for managing a bus architecture and performing normal processes, and the memory 1101 can store data for use by the processor 1100 while performing operations. The transceiver 1102 is configured to transmit and receive data under the control of the processor 1100.

The bus architecture can include any number of interconnecting buses and bridges to link together various circuits including one or more processors represented by the processor 1100, and one or more memories represented by the memory 1101. The bus architecture can further link together various other circuits, e.g., a peripheral device, a manostat, a power management circuit, etc., all of which are well known in the art, so a further description thereof will be omitted in this context. The bus interface serves as an interface. The processor 1100 is responsible for managing the bus architecture and performing normal processes, and the memory 1101 can store data for use by the processor 1100 while performing operations.

The flow according to the embodiment of the invention can be applicable to the processor 1100, or performed by the processor 1100. In an implementation, the respective steps in the flow can be performed by integrated logic circuits in hardware, or instructions in software, in the processor 1100. The processor 1100 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a micro processor, or can be any conventional processor, etc. The steps in the method according to the embodiment of the invention can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 1101, and the processor 1100 reads the information in the memory 1100, and performs the steps in the flow with the hardware thereof.

Specifically the processor 1100 is configured to read and execute program in the memory 1101:

To obtain a third frequency domain position for determining a downlink control channel resource set corresponding to the user equipment, based upon preset information of the first frequency domain position of a predefined first downlink control channel resource set, and/or based upon received first information, transmitted by a base station, including indication information of the second frequency domain position of the first downlink control channel resource set;

To obtain a third time domain position for determining the downlink control channel resource set corresponding to the user equipment, based upon preset information of the first time domain position of the predefined first downlink control channel resource set, and/or based upon the received first information, transmitted by the base station, including indication information of the second time domain position of the first downlink control channel resource set; and To determine the downlink control channel resource set corresponding to the user equipment as a third downlink control channel resource set based upon the third frequency domain position and the third time domain position.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally when the preset information of the first frequency domain position is a fourth frequency domain position occupied by a PBCH and/or a PSS and/or an SSS, the processor 1100 is configured: to obtain the third frequency domain position for determining the downlink control channel resource set corresponding to the user equipment, based upon the fourth frequency domain position.

Optionally when the preset information of the first frequency domain position is a first preset offset value from a fourth frequency domain position occupied by a PBCH and/or a PSS and/or an SSS, the processor 1100 is configured: to obtain the third frequency domain position for determining the downlink control channel resource set corresponding to the user equipment, based upon the fourth frequency domain position and the first preset offset value.

Optionally when the preset information of the first frequency domain position is a fourth frequency domain position occupied by a PBCH and/or a PSS and/or an SSS, the processor 1100 is configured: to obtain the indication information of the second frequency domain position of the first downlink control channel resource set based upon the received first information, transmitted by the base station, including the indication information of the second frequency domain position, where the indication information of the second frequency domain position is indication information indicating a second offset value from the fourth frequency domain position; and to obtain the third frequency domain position for determining the downlink control channel resource set corresponding to the user equipment, based upon the fourth frequency domain position and the second preset offset value.

Optionally the processor 1100 is configured: to obtain the indication information of the second frequency domain position of the first downlink control channel resource set based upon the received first information, transmitted by the base station, including the indication information of the second frequency domain position, where the indication information of the second frequency domain position is indication information indicating a frequency domain position of the downlink control channel resource set corresponding to the user equipment; and to obtain the third frequency domain position for determining the downlink control channel resource set corresponding to the user equipment, based upon the indication information of the second frequency domain position.

Optionally the processor 1100 is configured: to obtain the indication information of the second time domain position of the first downlink control channel resource set based upon the received first information, transmitted by the base station, including the indication information of the second time domain position, where the indication information of the second time domain position is indication information indicating a time domain position of the downlink control channel resource set corresponding to the user equipment; and to obtain the third time domain position for determining the downlink control channel resource set corresponding to the user equipment, based upon the indication information of the second time domain position.

Optionally the processor 1100 is configured: to obtain the third time domain position for determining the downlink control channel resource set corresponding to the user equipment, based upon a preset size of the first time domain position and a preset start position of the first time domain position of the predefined first downlink control channel resource set.

Optionally the first information is higher-layer signaling; and the first downlink control channel resource set is configured for transmitting a UE-specific downlink control channel.

Optionally the processor 1100 is configured: to obtain the third frequency domain position for determining the downlink control channel resource set corresponding to the user equipment, based upon a preset size of the first frequency domain position and a preset start position of the first frequency domain position of the predefined first downlink control channel resource set.

Optionally the processor 1100 is configured: to obtain the indication information of the second frequency domain position of the first downlink control channel resource set based upon the received first information, transmitted by the base station, including the indication information of the second frequency domain position, where the indication information of the second frequency domain position is indication information indicating a frequency domain position of the downlink control channel resource set corresponding to the user equipment; and to obtain the third frequency domain position for determining the downlink control channel resource set corresponding to the user equipment, based upon the indication information of the second frequency domain position.

Optionally the indication information of the second frequency domain position is indication information indicating a start frequency domain position of the downlink control channel resource set corresponding to the user equipment, and a frequency domain resource size occupied by the downlink control channel resource set corresponding to the user equipment; or the indication information of the second frequency domain position is indication information of element indexes corresponding to frequency domain resource elements occupied by the downlink control channel resource set corresponding to the user equipment, or element group indexes corresponding to frequency domain resource element groups occupied by the downlink control channel resource set corresponding to the user equipment.

Optionally when the preset information of the first frequency domain position is a preset start position of the first frequency domain position, the processor 1100 is configured:

To obtain the indication information of the second frequency domain position of the first downlink control channel resource set based upon the received first information, transmitted by the base station, including the indication information of the second frequency domain position, where the indication information of the second frequency domain position indicates a frequency domain position size occupied by the first downlink control channel resource set; and To obtain the third frequency domain position for determining the downlink control channel resource set corresponding to the user equipment, based upon the preset start position of the first frequency domain position, and the frequency domain position size occupied by the first downlink control channel resource set.

Optionally the processor 1100 is configured: to obtain the third time domain position for determining the downlink control channel resource set corresponding to the user equipment, based upon a preset size of the first time domain position and a preset start position of the first time domain position of the predefined first downlink control channel resource set.

Optionally the processor 1100 is configured:

To obtain the indication information of the second time domain position of the first downlink control channel resource set based upon the received first information, transmitted by the base station, including the indication information of the second time domain position, where the indication information of the second time domain position is indication information indicating a time domain position of the downlink control channel resource set corresponding to the user equipment; and To obtain the third time domain position for determining the downlink control channel resource set corresponding to the user equipment, based upon the indication information of the second time domain position.

Figure 12:
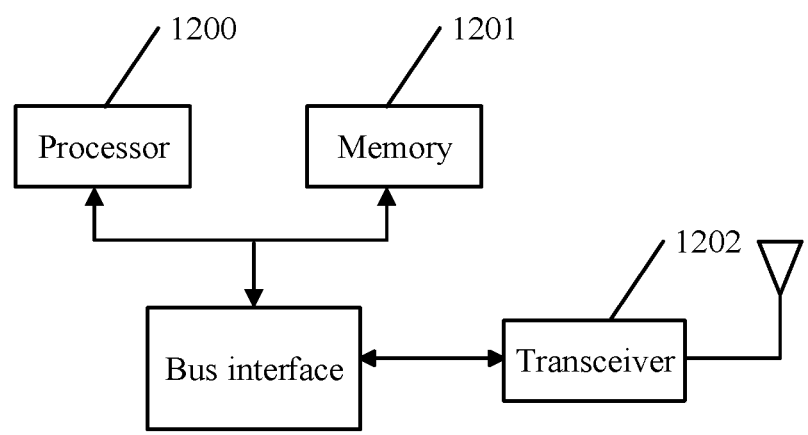
FIG. 12 is a schematic structural diagram of a base station according to an embodiment of the invention.

As illustrated in FIG. 12, another base station according to an embodiment of the invention includes: a processor 1200, a memory 1201, and a transceiver 1202.

The processor 1200 is responsible for managing a bus architecture and performing normal processes, and the memory 1201 can store data for use by the processor 1200 while performing operations. The transceiver 1202 is configured to transmit and receive data under the control of the processor 1200.

The bus architecture can include any number of interconnecting buses and bridges to link together various circuits including one or more processors represented by the processor 1200, and one or more memories represented by the memory 1201. The bus architecture can further link together various other circuits, e.g., a peripheral device, a manostat, a power management circuit, etc., all of which are well known in the art, so a further description thereof will be omitted in this context. The bus interface serves as an interface. The processor 1200 is responsible for managing the bus architecture and performing normal processes, and the memory 1201 can store data for use by the processor 1200 while performing operations.

The flow according to the embodiment of the invention can be applicable to the processor 1200, or performed by the processor 1200. In an implementation, the respective steps in the flow can be performed by integrated logic circuits in hardware, or instructions in software, in the processor 1200. The processor 1200 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a micro processor, or can be any conventional processor, etc. The steps in the method according to the embodiment of the invention can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 1201, and the processor 1200 reads the information in the memory 1200, and performs the steps in the flow with the hardware thereof.

Specifically the processor 1200 is configured to read and execute program in the memory 1201: to transmit first information, including indication information of the second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or to transmit the first information, including indication information of the second time domain position of the first downlink control channel resource set, to the user equipment so that the user equipment obtains the indication information of the second time domain position for determining a third time domain position of the downlink control channel resource set corresponding to the user equipment, based upon the first information.

Optionally the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

Optionally the indication information of the second frequency domain position indicates the second frequency domain position directly; or when a first preset frequency domain position corresponding to the user equipment is predefined, the indication information of the second frequency domain position indicates a first preset offset value of the second frequency domain position from the first preset frequency domain position.

Optionally the indication information of the second time domain position indicates the second time domain position directly.

Optionally the first information is higher-layer signaling; and the first downlink control channel resource set is configured for transmitting a UE-specific downlink control channel.

Optionally the indication information of the second frequency domain position indicates the second frequency domain position directly; or when a first preset start frequency domain position corresponding to the user equipment is predefined, the indication information of the second frequency domain position indicates the size of the second frequency domain position.

Optionally the indication information of the second time domain position indicates the second time domain position directly.

An embodiment of the invention provides a readable storage medium including program codes configured, upon being executed on a computing device, to cause the computing device to perform the operations of the user equipment above.

An embodiment of the invention provides a readable storage medium including program codes configured, upon being executed on a computing device, to cause the computing device to perform the operations of the base station above.

There are at least the following technical effects or advantages of the technical solutions according to the embodiments above of the invention: the user equipment can be freed from listening to its downlink control channel throughout a transmission bandwidth, and for such a scenario in a 5G system as ascertained in the sessions of the existing standard that a common PDCCH is transmitted on a part of downlink control channel resources, and a UE-specific PDCCH is transmitted on the other part of the downlink control channel resources, there is proposed a technical solution to determining specific time domain and frequency domain positions of a downlink control channel resource set for the purpose of configuring the position of the downlink control channel resource set in the transmission bandwidth flexibly to thereby lower power consumption of the user equipment, and facilitate interference control n in a future wireless communication system.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for determining a downlink control channel resource set, applied in a user equipment, the method comprising:
obtaining a third frequency domain position for determining a downlink control channel resource set corresponding to the user equipment, based upon preset information of a first frequency domain position of a predefined first downlink control channel resource set, and/or based upon received first information, transmitted by a base station, comprising indication information of a second frequency domain position of the first downlink control channel resource set;
obtaining a third time domain position for determining the downlink control channel resource set corresponding to the user equipment, based upon preset information of a first time domain position of the predefined first downlink control channel resource set, or based upon the received first information, transmitted by the base station, comprising indication information of a second time domain position of the first downlink control channel resource set; and
determining the downlink control channel resource set corresponding to the user equipment as a third downlink control channel resource set based upon the third frequency domain position and the third time domain position.

2. The method according to claim 1, wherein the first information is Master Information Block (MIB) information or System Information (SI); and
the first downlink control channel resource set is configured for transmitting a common downlink control channel, and/or the first downlink control channel resource set is configured for transmitting a UE-specific downlink control channel when the user equipment accesses a mobile communication network for the first time.

3. The method according to claim 2, wherein when the preset information of the first frequency domain position is a fourth frequency domain position occupied by a Physical Broadcast Channel (PBCH) and/or a Primary Synchronization Signal (PSS) and/or a Secondary Synchronization Signal (SSS), the obtaining the third frequency domain position for determining the downlink control channel resource set corresponding to the user equipment, based upon the preset information of the first frequency domain position of the predefined first downlink control channel resource set comprises:
obtaining the third frequency domain position for determining the downlink control channel resource set corresponding to the user equipment based upon the fourth frequency domain position;
or,
when the preset information of the first frequency domain position is a first preset offset value from a fourth frequency domain position occupied by a PBCH and/or a PSS and/or an SSS, the obtaining the third frequency domain position for determining the downlink control channel resource set corresponding to the user equipment, based upon the preset information of the first frequency domain position of the predefined first downlink control channel resource set comprises:
obtaining the third frequency domain position for determining the downlink control channel resource set corresponding to the user equipment, based upon the fourth frequency domain position and the first preset offset value.

4. The method according to claim 2, wherein when the preset information of the first frequency domain position is a fourth frequency domain position occupied by a PBCH and/or a PSS and/or an SSS, the obtaining the third frequency domain position for determining the downlink control channel resource set corresponding to the user equipment, based upon the preset information of the first frequency domain position of the predefined first downlink control channel resource set, and based upon the received first information, transmitted by the base station, comprising the indication information of the second frequency domain position of the first downlink control channel resource set comprises:

obtaining the indication information of the second frequency domain position of the first downlink control channel resource set based upon the received first information, transmitted by the base station, comprising the indication information of the second frequency domain position, wherein the indication information of the second frequency domain position is indication information indicating a second offset value from the fourth frequency domain position; and obtaining the third frequency domain position for determining the downlink control channel resource set corresponding to the user equipment, based upon the fourth frequency domain position and the second preset offset value.

5. The method according to claim 2, wherein the obtaining the third frequency domain position for determining the downlink control channel resource set corresponding to the user equipment, based upon the received first information, transmitted by the base station, comprising the indication information of the second frequency domain position of the first downlink control channel resource set comprises:

obtaining the indication information of the second frequency domain position of the first downlink control channel resource set based upon the received first information, transmitted by the base station, comprising the indication information of the second frequency domain position, wherein the indication information of the second frequency domain position is indication information indicating a frequency domain position of the downlink control channel resource set corresponding to the user equipment; and obtaining the third frequency domain position for determining the downlink control channel resource set corresponding to the user equipment, based upon the indication information of the second frequency domain position.

6. The method according to claim 2, wherein the obtaining the third time domain position for determining the downlink control channel resource set corresponding to the user equipment, based upon the received first information, transmitted by the base station, comprising the indication information of the second time domain position of the first downlink control channel resource set comprises:

obtaining the indication information of the second time domain position of the first downlink control channel resource set based upon the received first information, transmitted by the base station, comprising the indication information of the second time domain position, wherein the indication information of the second time domain position is indication information indicating a time domain position of the downlink control channel resource set corresponding to the user equipment; and obtaining the third time domain position for determining the downlink control channel resource set corresponding to the user equipment, based upon the indication information of the second time domain position.

7. The method according to claim 2, wherein the obtaining the third time domain position for determining the downlink control channel resource set corresponding to the user equipment, based upon the preset information of the first time domain position of the predefined first downlink control channel resource set comprises:

obtaining the third time domain position for determining the downlink control channel resource set corresponding to the user equipment, based upon a preset size of the first time domain position and a preset start position of the first time domain position of the predefined first downlink control channel resource set.

8. The method according to claim 1, wherein the first information is higher-layer signaling; and the first downlink control channel resource set is configured for transmitting a UE-specific downlink control channel.

9. The method according to claim 8, wherein the obtaining the third frequency domain position for determining the downlink control channel resource set corresponding to the user equipment, based upon the preset information of the first frequency domain position of the predefined first downlink control channel resource set comprises:

obtaining the third frequency domain position for determining the downlink control channel resource set corresponding to the user equipment, based upon a preset size of the first frequency domain position and a preset start position of the first frequency domain position of the predefined first downlink control channel resource set.

10. The method according to claim 8, wherein the obtaining the third frequency domain position for determining the downlink control channel resource set corresponding to the user equipment, based upon the received first information, transmitted by the base station, comprising the indication information of the second frequency domain position of the first downlink control channel resource set comprises:

obtaining the indication information of the second frequency domain position of the first downlink control channel resource set based upon the received first information, transmitted by the base station, comprising the indication information of the second frequency domain position, wherein the indication information of the second frequency domain position is indication information indicating a frequency domain position of the downlink control channel resource set corresponding to the user equipment; and obtaining the third frequency domain position for determining the downlink control channel resource set corresponding to the user equipment, based upon the indication information of the second frequency domain position.

11. The method according to claim 8, wherein when the preset information of the first frequency domain position is a preset start position of the first frequency domain position, the obtaining the third frequency domain position for determining the downlink control channel resource set corresponding to the user equipment, based upon the preset information of the first frequency domain position of the predefined first downlink control channel resource set, and based upon the received first information, transmitted by the base station, comprising the indication information of the second frequency domain position of the first downlink control channel resource set comprises:

obtaining the indication information of the second frequency domain position of the first downlink control channel resource set based upon the received first information, transmitted by the base station, comprising the indication information of the second frequency domain position, wherein the indication information of the second frequency domain position indicates a frequency domain position size occupied by the first downlink control channel resource set; and obtaining the third frequency domain position for determining the downlink control channel resource set corresponding to the user equipment, based upon the preset start position of the first frequency domain position, and the frequency domain position size occupied by the first downlink control channel resource set.

12. The method according to claim 8, wherein the obtaining the third time domain position for determining the downlink control channel resource set corresponding to the user equipment, based upon the preset information of the first time domain position of the predefined first downlink control channel resource set comprises:

obtaining the third time domain position for determining the downlink control channel resource set corresponding to the user equipment, based upon a preset size of the first time domain position and a preset start position of the first time domain position of the predefined first downlink control channel resource set.

13. The method according to claim 8, wherein the obtaining the third time domain position for determining the downlink control channel resource set corresponding to the user equipment, based upon the received first information, transmitted by the base station, comprising the indication information of the second time domain position of the first downlink control channel resource set comprises:

obtaining the indication information of the second time domain position of the first downlink control channel resource set based upon the received first information, transmitted by the base station, comprising the indication information of the second time domain position, wherein the indication information of the second time domain position is indication information indicating a time domain position of the downlink control channel resource set corresponding to the user equipment; and obtaining the third time domain position for determining the downlink control channel resource set corresponding to the user equipment, based upon the indication information of the second time domain position.

14. A method for transmitting resource position information of downlink control channel resource set, applied in a base station, the method comprising:

transmitting, by the base station, first information, comprising indication information of a second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or transmitting, by the base station, the first information, comprising indication information of a second time domain position of the first downlink control channel resource set, to the user equipment so that the user equipment obtains the indication information of the second time domain position for determining a third time domain position of the downlink control channel resource set corresponding to the user equipment, based upon the first information.

15. The method according to claim 14, wherein the first information is MIB information or SI; and the first downlink control channel resource set is configured for transmitting a common downlink control channel, and/or the first downlink control channel resource set is configured for transmitting a UE-specific downlink control channel when the user equipment accesses a mobile communication network for the first time.

16. The method according to claim 15, wherein the indication information of the second frequency domain position indicates the second frequency domain position directly; or when a first preset frequency domain position corresponding to the user equipment is predefined, the indication information of the second frequency domain position indicates a first preset offset value of the second frequency domain position from the first preset frequency domain position;

wherein the indication information of the second time domain position indicates the second time domain position directly.

17. The method according to claim 14, wherein the first information is higher-layer signaling; and the first downlink control channel resource set is configured for transmitting a UE-specific downlink control channel.

18. The method according to claim 17, wherein the indication information of the second frequency domain position indicates the second frequency domain position directly; or when a first preset start frequency domain position corresponding to the user equipment is predefined, the indication information of the second frequency domain position indicates a frequency domain size of the second frequency domain position;

wherein the indication information of the second time domain position indicates the second time domain position directly.

19. A user equipment for determining a downlink control channel resource set, comprising: a processor and a memory, wherein:

the processor is configured to read and execute program in the memory:

to obtain a third frequency domain position for determining a downlink control channel resource set corresponding to the user equipment, based upon preset information of a first frequency domain position of a predefined first downlink control channel resource set, and/or based upon received first information, transmitted by a base station, comprising indication information of a second frequency domain position of the first downlink control channel resource set;

to obtain a third time domain position for determining the downlink control channel resource set corresponding to the user equipment, based upon preset information of a first time domain position of the predefined first downlink control channel resource set, and/or based upon the received first information, transmitted by the base station, comprising indication information of a second time domain position of the first downlink control channel resource set; and to determine the downlink control channel resource set corresponding to the user equipment as a third downlink control channel resource set based upon the third frequency domain position and the third time domain position.

20. A base station for transmitting resource position information of a downlink control channel resource set, comprising: a processor and a memory, wherein:

the processor is configured to read and execute program in the memory:

to transmit first information, comprising indication information of a second frequency domain position of a first downlink control channel resource set, to a user equipment so that the user equipment obtains the indication information of the second frequency domain position for determining a third frequency domain position of a downlink control channel resource set corresponding to the user equipment, based upon the first information; and/or to transmit the first information, comprising indication information of a second time domain position of the first downlink control channel resource set, to the user equipment so that the user equipment obtains the indication information of the second time domain position for determining a third time domain position of the downlink control channel resource set corresponding to the user equipment, based upon the first information.

* * * * *